(12) United States Patent
Koifman et al.

(10) Patent No.: US 9,059,770 B2
(45) Date of Patent: Jun. 16, 2015

(54) SYSTEM AND METHODS FOR NULL STEERING IN A MULTICARRIER SYSTEM

(75) Inventors: Gil Koifman, Petach-Tikva (IL); Yaakov Shoshan, Ashkelon (IL)

(73) Assignee: ELTA SYSTEMS LTD., Ashdod (IL)

( * ) Notice: Subject to any disclaimer, the term of this patent is extended or adjusted under 35 U.S.C. 154(b) by 114 days.

(21) Appl. No.: 13/704,319

(22) PCT Filed: Jun. 13, 2011

(86) PCT No.: PCT/IL2011/000468
§ 371 (c)(1),
(2), (4) Date: Mar. 4, 2013

(87) PCT Pub. No.: WO2011/158230
PCT Pub. Date: Dec. 22, 2011

(65) Prior Publication Data
US 2013/0182785 A1 Jul. 18, 2013

(30) Foreign Application Priority Data
Jun. 16, 2010 (IL) .......................................... 206417

(51) Int. Cl.
*H04B 15/00* (2006.01)
*H04B 1/12* (2006.01)
*H04B 1/10* (2006.01)
(Continued)

(52) U.S. Cl.
CPC .. *H04B 1/12* (2013.01); *H04B 1/10* (2013.01); *H04B 15/00* (2013.01); *H04B 1/1081* (2013.01); *H04L 5/0023* (2013.01); *H04L 5/0044* (2013.01); *H04L 27/2647* (2013.01)

(58) Field of Classification Search
CPC ............ H04B 15/00; H04B 1/10; H04B 7/02; H04B 1/1081
USPC .......................... 375/285, 259–260, 346–350
See application file for complete search history.

(56) References Cited

U.S. PATENT DOCUMENTS

| 4,236,158 A | 11/1980 | Daniel |
| 5,357,257 A | 10/1994 | Nevin |

(Continued)

OTHER PUBLICATIONS

Response to Written Opinion for PCT/IL2011/468, dated Nov. 5, 2012.

(Continued)

*Primary Examiner* — Jean B Corrielus
(74) *Attorney, Agent, or Firm* — Fleit Gibbons Gutman Bongini & Bianco PL; Martin Fleit; Paul D. Bianco

(57) ABSTRACT

A system and methods for cancelling spatial interference associated with an original multi-carrier signal carrying at least one data transmission sent by a transmitter to an antenna array comprising a plurality of antennae and having a receiver operatively associated therewith, the system receiving a plurality of received signals respectively including interference and the original signal as received by a respective individual antenna from among the plurality of antennae, the system comprising a spatial nulling device for generating a cleaner signal by reducing at least one spatial component of the interference; and a signal manipulator operative to manipulate a derivative of the received signal so as to cause the at least one data transmission to be more concentrated in a subset of frequency bands in which the spatial nulling device is more effective and to be less concentrated in frequency bands which do not belong to the subset of frequency bands.

28 Claims, 19 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 5,363,111 A | 11/1994 | Murphy | |
| 5,990,831 A * | 11/1999 | McDowell | 342/378 |
| 6,115,409 A | 9/2000 | Upadhyay et al. | |
| 8,019,029 B1 * | 9/2011 | Katic | 375/346 |
| 8,676,144 B2 * | 3/2014 | Guo et al. | 455/307 |
| 2004/0146024 A1 | 7/2004 | Li et al. | |
| 2008/0095282 A1 * | 4/2008 | Walton et al. | 375/347 |
| 2009/0247182 A1 | 10/2009 | Tamate | |
| 2009/0323836 A1 * | 12/2009 | Nakano et al. | 375/260 |
| 2010/0303182 A1 * | 12/2010 | Daneshrad et al. | 375/346 |
| 2012/0021687 A1 * | 1/2012 | Parker | 455/63.1 |
| 2013/0089009 A1 * | 4/2013 | Li et al. | 370/278 |

OTHER PUBLICATIONS

Hourani, H., "An Overview of Adaptive Antenna Systems" pp. 1-5. Helsinki University of Technology Communications Lab, 2004/2005.
Santamaria. I., "Optimal Mimo Transmission Schemes with Adaptive Antenna Combining in The Rf Path" Journal pp. 1-5. 16th European Signal Processing Conference, Aug. 2008.
Das, "Smart Antenna Design for Wireless Communication using Adaptive Beam-forming Approach" downloaded 2009.
Fazel, K., "Narrow-Band Interference Rejection in Orthogonal Multi-carrier Spread-Spectrum Communications" pp. 46-50, Sep. 27, 1994.
Litva, J et al., "Digital Beamforming in Wireless Communications" Book, pp. 1-314, 1996.
Gross, F., "Smart Antennas for Wireless Communications" Book, pp. 1-284, The McGraw-Hill Companies, 2005.
3GPP Specification Detail, 3GPP TS 36.302, printed Oct. 2013, Services provided by the physical layer.
International preliminary report on patentability for PCT/IL2011/468 mailed Dec. 5, 2012.
Written Opinion for PCT/IL2011/468, Dec. 2012.
International Search Report for PCT/IL2011/468, Feb. 2012.
Loadman, C. et al., "An Overview of Adaptive Antenna Technologies For Wireless Communications" Journal, pp. 1-5. Communication Networks and Services Research Conference 2003.
Kootsookes, P.,"Imposing pattern nulls on broadband array responses" pp. 1-9, Department of Systems Engineering, RSISE, Australian National University, Canberra. Received Sep. 20, 1996; revised Nov. 25, 1998; accepted Feb. 25, 1999.
Kenyon, Y., "An Examination of the Processing Complexity of an Adaptive Antenna System (AAS) for WiMAX". Journal pp. 1-5. Multiple Access Comunications Limited, UK. Sep. 2005.
Widrow, B et al., "Adaptive Antenna Systems" Journal pp. 1-17. Proceedings of the Ieee, vol. 55, No. 12, Dec. 1967.
Arson, S et al., "WiMax Technologies, Performance Analysis, and QoS". Book pp. 1-296. CRC Press Taylor & Francis Group 2008.
Cheuk, W., "Null-steering LMS Dual-Polarised Adaptive Antenna Arrays for GPS" Journal, pp. 1-10, Journal of Global Positioning Systems (2005), vol. 4, No. 1-2: 258-267.
Sebire, B., "3GPP Specification Detail" pp. 1-2, Oct. 2013.
Henderson, J., "Wideband" p. 1 of 1, United States Patent and Trademark Office,Oct. 2008.
Budsabathon, M., "Optimum Beamforming for Pre-FFT OFDM Adaptive Antenna Array" Journal pp. 1-12, Ieee Transactions on Vehicular Technology. vol. 53. No. 4, Jul. 2004.
Godara, L., "Smart Antennas" Book pp. 1-458, CRC Press 2004.

* cited by examiner

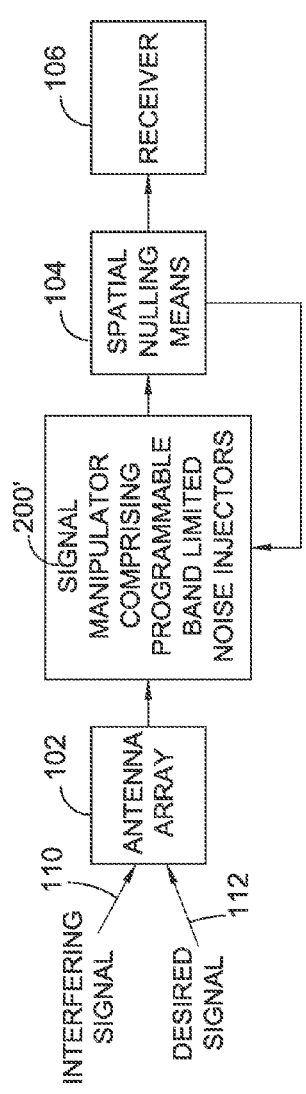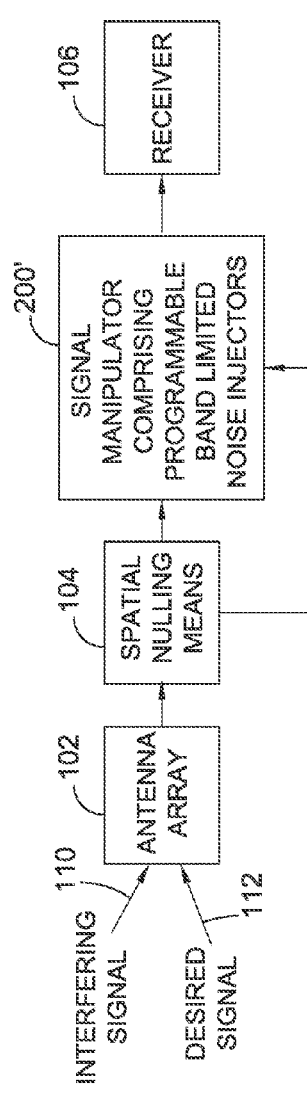

SYSTEM AND METHODS FOR NULL STEERING IN A MULTICARRIER SYSTEM

REFERENCE TO CO-PENDING APPLICATIONS

Priority is claimed from Israeli application No. 206417, entitled "System and Methods for Null Steering In a Multicarrier System" as filed on Jun. 16, 2010.

FIELD OF THE INVENTION

The present invention relates generally to multicarrier communication systems and more particularly to coping with interference in multicarrier communication systems.

BACKGROUND OF THE INVENTION

Conventional technology pertaining to certain embodiments of the present invention is described in the following publications inter alia:
Spatial Array Processing, Murat Torlak, The University of Texas at Austin, available on the World Wide Web
An Overview of Adaptive Antenna Systems, Hafeth Hourani, Helsinki University of Technology, available on the World Wide Web
An Overview of Adaptive Antenna Technologies For Wireless Communications, Chris Loadman, Dr. Zhizhang Chen & Dylan Jorgensen, Dalhousie University, available on the World Wide Web
Optimal MIMO Transmission Schemes with Adaptive Antenna Combining in the RF Path, Santamaria et al., European signal processing conference 2008, available on the World Wide Web
Smart Antenna Design for Wireless Communication using Adaptive Beam-forming Approach, Susmita Das, National Institute of Technology, Rourkela, India, available on the World Wide Web
An Examination of the Processing Complexity of an Adaptive Antenna System for WiMAX, Li et al., DSPEnabledRadio Conference, 2005, available on the World Wide Web
U.S. Pat. No. 5,363,111 to Murphy, entitled "Apparatus and method for spatial nulling of interfering signals"
Adaptive Antenna Systems, Widrow et al., IEEE proceedings, 1967, available on the World Wide Web
3GPP TS 36.300—Evolved Universal Terrestrial Radio Access (E-UTRA) and Evolved Universal Terrestrial Radio Access Network (E-UTRAN); Overall description; Stage 2, available on the World Wide Web
3GPP TS 36.302—Evolved Universal Terrestrial Radio Access (E-UTRA); Services provided by the physical layer, available on the World Wide Web
Imposing pattern nulls on broadband array responses, Peter Kootsookos et al., Journal Acoustical Society of America, 105 (6), June 1999
Digital Beamforming in Wireless Communications, John Litva and Titus Kwok-Yeung Lo, Artech House, 1996
Smart Antennas, Lal Chand Godara, CRC Press, 2004
Smart Antennas for Wireless Communications, Frank Gross, McGraw-Hill, 2005
WiMAX Technologies, Performance analysis, and QoS, Syed Ahson and Mohammad Ilyas, CRC Press, 2008
"Null-steering LMS Dual-Polarised Adaptive Antenna Arrays for GPS", W. C. Cheuk, M. Trinkle & D. A. Gray, Journal of Global Positioning Systems (2005), Vol. 4, No. 1-2: 258-267

The disclosures of all publications and patent documents mentioned in the specification, and of the publications and patent documents cited therein directly or indirectly, are hereby incorporated by reference.

SUMMARY OF THE INVENTION

Spatial nulling and spatial interference cancellation is a known subject in the field of communications. The basics of these techniques is using multiple antennas (antenna array) at the receiver, and combining the signals from the antennas in a way that some optimization criteria are achieved. For example, criteria may minimize the received energy from spatial directions of interferers (one or more) while maintaining a proper received energy of the desired signal. Some other criteria may maximize the ratio of the desired signal energy to the energy of the received interferers.

Prior art FIG. 1 illustrates the conventional method for such spatial interference cancellers which is well known from the prior art and aptly illustrated, for example, in FIG. 1 of U.S. Pat. No. 5,363,111. Conventional spatial nulling is described inter alia in the following publications:
Null-steering LMS Dual-Polarised Adaptive Antenna Arrays for GPS, W C Cheuk, M Trinkle & D A Gray, Journal of Global Positioning Systems (2005), Vol. 4, No. 1-2: 258-267, particularly FIG. 1
An Overview of Adaptive Antenna Systems, Hafeth Hourani, Helsinki University of Technology—particularly FIG. 1+FIG. 2
An Overview of Adaptive Antenna Technologies For Wireless Communications, Chris Loadman, Dr. Zhizhang Chen & Dylan Jorgensen, Dalhousie University—particularly FIG. 1
Smart Antenna Design for Wireless Communication using Adaptive Beam-forming Approach, Susmita Das, National Institute of Technology, Rourkela, India—particularly FIG. 1
Digital Beamforming in Wireless Communications, John Litva and Titus Kwok-Yeung Lo, Artech House—particularly chapter 2+FIG. 2.16
Smart Antennas, Lal Chand Godara, CRC Press—chapter 2, especially section 2.3, and FIG. 2.1,
Smart Antennas for Wireless Communications, Frank Gross, McGraw-Hill, especially chapter 1 FIG. 1.1,—section 8.3.1+FIG. 8.2, section 8.4.

A desired signal 112, coming from a particular spatial direction, is received by an antenna array 102. One or more interfering signals 110, coming from various other spatial directions, are also received by the antenna array 102. The antenna array comprises two or more antennas, each of them receiving the superposition of the desired signal and the interfering signal(s). Generally, having more antennas in the antenna array enhances the performance of the method, and enables the cancellation of more interferers. The received signals from the antenna array are then fed into spatial nulling means 104, which combines them into a single signal using some combining method. The combining method may be implemented by analog means or by digital means. The combining method applies either relative delay, gain or phase to the various signals prior to the combining. The combined signal is then fed into the receiver 106. Receiver 106 may be, for example, a demodulator for the desired signal 112. The spatial nulling means 104 may, for example, minimize the energy received from a specific spatial direction. This is called "Spatial Nulling", or "Null Steering".

Optionally, desired signal 112 comprises a plurality of desired signals, each coming from a particular spatial direction. For example, in a multi-user communication system a plurality of desired signals are transmitted by a plurality of users, to be received by receiver 106.

Prior art FIG. 2 illustrates some known in the art embodiments of the spatial nulling means 104. Each antenna 140 in antenna array 102 is first fed into an RF front end 142. The RF front end may comprise a Low-Noise-Amplifier (LNA), and may optionally comprise down-convertor. The signals from the RF front end are then fed into a weights computation 146, which implements the chosen combining method. The weights computation unit 146 computes and generates complex weights 150, one per antenna. The signals from the RF front end 142 and the appropriate weights 150 are then multiplied by multiplier 144, and summed by the combiner 148 to a single signal. This method of complex weights multiplication may be implemented either in RF (Radio Frequency), IF (Intermediate Frequency) or Baseband.

Prior art FIG. 3a illustrates an example of the spatial gain pattern of the combined signal. The graph shape and values depend on the computed weights, the number of antennas, and the antenna characteristics, and is given here only as an example. In this example, a spatial null of about 30 dB is achieved at the direction (angle) of about 0 degrees, while at directions far from the null by 10 degrees or more, desired signals are received with a ripple of 5 dB. FIG. 3b illustrates an example of two spatial nulls, at −60 degrees and at about 22 degrees, for the suppression of two interferers.

Prior art FIGS. 3a and 3b illustrates the gain pattern for a single frequency. In other frequencies, the null depth and the gain pattern in general, change. For a wideband signal, such as used by modern digital communications, this may be a problem.

Prior art FIG. 4 illustrates an example of the combined signal frequency response 160 of the example in FIG. 3a, at the spatial angle of 0 degrees. In this example, a bandwidth of 100 MHz centered at 1 GHz is considered. At the spatial angle of 0 degrees, which is the designed null direction, some frequencies of the interferer signal are suppressed by more than 50 dB, while other frequencies of the interferer are suppressed only by 25 dB, which might not be enough in some scenarios. This example demonstrates the difficulties and the problems in traditional spatial nulling means for a wideband signal.

A multicarrier communication system is a system that uses a wideband digital modulated multicarrier signal for transmission. The bandwidth (of frequencies) is divided into multiple carriers, each of them carrying a digital modulated transmission. Some specific techniques of multicarrier communication are OFDM (Orthogonal Frequency Division Multiplexing) and OFDMA (Orthogonal Frequency Division Multiple Access). Some examples of communication standards that use multicarrier techniques are WiMAX, LTE, WiFi and many more. FIG. 11a illustrates a multicarrier signal 300.

In a multicarrier receiver, one known method for spatial interference cancellation is performing the method shown in prior art FIG. 2, but for each carrier independently. This is known as "post-FFT" technique. The receiver 106 gets the signals directly from the antennas 140, and performs a Fast Fourier Transform (FFT) on each of them, separating the signals to a group of carriers. Then, spatial nulling is applied independently for each of the carriers. For each carrier, weights are computed and the appropriate signals from the antennas are combined using these weights. This method shows good performances, and solves the problem of the wideband frequency response of the null, but has some disadvantages. First, the complexity of the spatial nulling means is very high, because it is done separately on each carrier (for example, 2048 carriers is a typical value). Secondly, it involves adding the spatial nulling means inside the receiver or demodulator. Many times this is not possible because the receiver or demodulator is a closed element which cannot be modified, or can only be modified in a very costly fashion.

Conventionally, data transmission allocations are usually mastered by a scheduler e.g. in the above referenced publication entitled "WiMAX Technologies Performance Analysis and QoS", particularly in chapter 9, and in both 3GPP standards referenced above, regarding a Scheduler in LTE Standard residing at one side of the communication system (either at the local side of the receiver, or at the remote side of the transmitter). The scheduler determines and allocates carrier frequencies for the use of the data transmissions, i.e. it determines onto which frequencies (carriers) the data will be transmitted. The scheduler's operational method takes into consideration, amongst other criteria, the channel quality over the various frequencies. Optionally, the scheduler's operational method also determines how much data will be transmitted over each of the carriers, i.e. how many bits per symbol will be transmitted over each carrier. The latter is commonly referred to as the "Bit Loading" or "Bit Allocation" method. In the case of a multi-user system, the scheduler also takes into consideration the throughput requirements and the QoS (Quality of Service) of each user, and the specific channel quality over various frequencies for each user.

Certain embodiments of the present invention seek to provide a method for enabling the usage of spatial nulling means and of weighted antenna summation for a wideband multicarrier communication signals, by applying a frequency-selective signal manipulator before the spatial nulling means.

Certain embodiments of the present invention seek to provide a frequency selective signal manipulator as a programmable multi-band BPF.

Certain embodiments of the present invention seek to provide a frequency selective signal manipulator as a programmable multi-band band-limited noise injectors.

Certain embodiments of the present invention seek to provide a frequency selective signal manipulator being configured/adjusted according to the designed nulling characteristics, as designed by the nulling means.

Certain embodiments of the present invention seek to provide a frequency selective signal manipulator being configured/adjusted according to the actual nulling characteristics, as measured at the output of the nulling means, typically without modifications to a standard receiver.

Certain embodiments of the present invention seek to provide a method for enabling the usage of spatial nulling means and of weighted antenna summation for wideband multicarrier communication signals, by reserving an empty region within the frame (this is done by appropriate configuration applied to the system scheduler), in which the spatial nulling methods could adapt. The empty region is typically dynamically allocated according to measured interferers' level.

Certain embodiments of the present invention seek to provide a method for detection of the empty region by analyzing the received signal from the antennas and/or by analyzing the signal emerging from the spatial nulling means. Empty region detection may be performed by the receiver via a suitable interface. In WiMAX applications, an empty region can be configured an empty zone. In LTE applications, an empty region can be configured on an empty RB (Resource Block).

There is thus provided, in accordance with at least one embodiment of the present invention, a system for cancelling spatial interference associated with an original multi-carrier signal carrying at least one data transmission sent by a transmitter to an antenna array comprising a plurality of antennae and having a receiver operatively associated therewith, the system receiving a plurality of received signals respectively including the interference and the original signal as received by a respective individual antenna from among the plurality of antennae, the system comprising a spatial nulling device for generating a cleaner signal by reducing at least one spatial component of the interference; and a signal manipulator operative to manipulate a derivative of the received signal so as to cause the at least one data transmission to be more concentrated in a subset of frequency bands in which the spatial nulling device is more effective and to be less concentrated in frequency bands which do not belong to the subset of frequency bands.

The spatial interference may be generated by one or typically more interference sources. The derivative of the received signal may for example be the received signal itself. Signal manipulation may occur after spatial nulling.

Further in accordance with at least one embodiment of the present invention, the system also comprises an antenna array.

Still further in accordance with at least one embodiment of the present invention, the signal manipulator comprises a programmable band pass filter device which filters a signal to be filtered derived from a signal received by at least one of the antennae so as to pass at least one frequency band inside the subset and to block at least one frequency band outside the subset.

The signal to be filtered derived from an individual signal received by an individual antenna may, according to one embodiment, be the individual signal itself.

The band pass filter device typically but not necessarily comprises an array of band pass filters including a plurality of band pass filters corresponding in number to the plurality of antennae.

Further in accordance with at least one embodiment of the present invention, the spatial nulling device includes a dynamic weighted antenna summation functionality operative to dynamically compute a weighted sum of signals received by the plurality of antennae wherein the weighting is performed in accordance with a plurality of weighting coefficients corresponding in number to the plurality of antennae and selected to reduce at least one spatial component of the received signal which includes interference.

Still further in accordance with at least one embodiment of the present invention, each band pass filter has dynamically computed filter coefficients and wherein the signal manipulator also comprises a filter coefficient computer operative to dynamically compute the filter coefficients.

Additionally in accordance with at least one embodiment of the present invention, the spatial nulling device includes a weighted antenna summation functionality operative to compute a weighted sum of signals received by the plurality of antennae wherein the weighting is performed in accordance with a plurality of weighting coefficients corresponding in number to the plurality of antennae, and wherein the filter coefficient computer is operative to use the plurality of weighting coefficients to dynamically compute the filter coefficients.

Further in accordance with at least one embodiment of the present invention, the signal manipulator comprises an array of programmable band limited noise injectors including a plurality of programmable band limited noise injectors corresponding in number to the plurality of antennae, wherein each noise injector adds noise to the signal received from the antenna corresponding to the noise injector, such that noise is added only to frequency bands outside the subset and not to frequency bands inside the subset.

Still further in accordance with at least one embodiment of the present invention, the noise comprises white Gaussian noise.

It is appreciated that a single noise generator may be provided to feed the same noise to all injectors in the array. Alternatively, a separate noise generated may feed each of the injectors in the array.

Further in accordance with at least one embodiment of the present invention, the signal manipulator comprises an array of programmable band pass filters including a plurality of band pass filters corresponding in number to the plurality of antennae and wherein each individual band pass filter filters the signal received from the antenna corresponding to the individual band pass filter so as to pass all frequency bands inside the subset and to block all frequency bands outside the subset.

Still further in accordance with at least one embodiment of the present invention, the signal manipulator receives information indicative of the cleaner signal and operates in accordance therewith.

Additionally in accordance with at least one embodiment of the present invention, the information indicative of the cleaner signal comprises the cleaner signal itself.

Further in accordance with at least one embodiment of the present invention, the information indicative of the cleaner signal comprises a result of spectral analysis performed on the cleaner signal.

Still further in accordance with at least one embodiment of the present invention, the signal manipulator determines the subset at least partly based on the information indicative of the cleaner signal.

Additionally in accordance with at least one embodiment of the present invention, the signal manipulator determines the subset at least partly based on at least a portion of the plurality of weighting coefficients.

Further in accordance with at least one embodiment of the present invention, the signal manipulator receives signals from the antenna array and feeds signal to the spatial nulling device and wherein the programmable band pass filter device comprises a plurality of band pass filters corresponding in number to the plurality of antennae and wherein the programmable band pass filter device comprises an array of programmable band pass filters including a plurality of band pass filters corresponding in number to the plurality of antennae and wherein each individual band pass filter filters the signal received from the antenna corresponding to the individual band pass filter so as to pass at least one frequency band inside the subset and to block at least one frequency band outside the subset.

Further in accordance with at least one embodiment of the present invention, the spatial nulling device receives signals from the antenna array and feeds signal to the signal manipulator and wherein the signal to be filtered comprises an output signal generated by the spatial nulling device.

Further in accordance with at least one embodiment of the present invention, the signal manipulator performs at least one frequency-dependent operation on the signal.

Still further in accordance with at least one embodiment of the present invention, the signal comprises a communication signal.

Additionally in accordance with at least one embodiment of the present invention, the signal comprises a wideband signal.

Also provided, in accordance with at least one embodiment of the present invention, in a multi-carrier communication system including a receiver, at least one transmitter transmitting a multi-carrier signal to the receiver, an interference canceller for cancelling spatial interference and a scheduler which is operative, for each individual time frame along a temporal axis, to allocate to various data transmissions, respective portions of a time-frequency region defined over the individual time frame, the multi-carrier signal defining a multiplicity of carriers together spanning a frequency band, is a method for adapting the interference canceller to the interference, the method comprising using the scheduler to reserve at least one empty sub-region within the time-frequency region by allocating only portions external to the sub-region to each of the data transmissions; and configuring the interference canceller by deriving, from signal content in the empty sub-region, at least one interference-dependent parameter of the interference canceller's operation.

Further in accordance with at least one embodiment of the present invention, the empty sub-region includes the entire frequency band and only a portion of the time frame.

Still further in accordance with at least one embodiment of the present invention, the empty sub-region includes only a portion of the frequency band and only a portion of the time frame.

Additionally in accordance with at least one embodiment of the present invention, the empty sub-region includes only a portion of the frequency band and the entire time frame.

Further in accordance with at least one embodiment of the present invention, the using the scheduler comprises configuring the scheduler to reserve the at least one empty sub-region by allocating only the portions external to the sub-region to each of the data transmissions.

Still further in accordance with at least one embodiment of the present invention, using the scheduler comprises generating a request to the scheduler for allocation of a sub-region within the time-frequency region to an auxiliary transmitter; employing the scheduler to accede to the request by allocating at least one individual sub-region to the auxiliary transmitter; and refraining from transmitting within the individual sub-region.

Further in accordance with at least one embodiment of the present invention, no auxiliary transmitter is provided and the request to the scheduler for allocation to an auxiliary transmitter comprises a simulated request.

Still further in accordance with at least one embodiment of the present invention, the receiver is located at a first location and wherein the method also comprises providing the auxiliary transmitter at a second location which differs from the first location.

Additionally in accordance with at least one embodiment of the present invention, the method also comprises providing the auxiliary transmitter co-located with the receiver.

Also provided, in accordance with at least one embodiment of the present invention, is a method for cancelling spatial interference associated with an original multi-carrier signal carrying at least one data transmission sent by a transmitter to an antenna array comprising a plurality of antennae and having a receiver operatively associated therewith, the system receiving a plurality of received signals respectively including the interference and the original signal as received by a respective individual antenna from among the plurality of antennae, the system comprising using a spatial nulling device for generating a cleaner signal by reducing at least one spatial component of the interference; and manipulating a derivative of the received signal so as to cause the at least one data transmission to be more concentrated in a subset of frequency bands in which the spatial nulling device is more effective and to be less concentrated in frequency bands which do not belong to the subset of frequency bands.

Further in accordance with at least one embodiment of the present invention, the method also comprises providing a scheduler which is operative, for each individual time frame along a temporal axis, to allocate to the at least one data transmission, at least one respective portion of a time-frequency region defined over the individual time frame; and adapting the spatial nulling device to the interference, the adapting comprising using the scheduler to reserve at least one empty sub-region within the time-frequency region by allocating only at least one portion external to the sub-region to the at least one data transmission, rather than allocating any portion disposed internally of the sub-region to the at least one data transmission; and configuring the spatial nulling device by deriving, from signal content in the empty sub-region, at least one interference-dependent parameter of the spatial nulling device's operation.

Further in accordance with at least one embodiment of the present invention, the manipulating includes manipulating the received signal to cause the transmitter-receiver communications to be allocated only to a subset of frequency bands in which the spatial nulling device answers to a predetermined effectiveness criterion.

Still further in accordance with at least one embodiment of the present invention, the manipulating includes manipulating the received signal to cause the transmitter-receiver communications to be allocated only to a subset of frequency bands in which the spatial nulling device answers to a predetermined effectiveness criterion.

Additionally in accordance with at least one embodiment of the present invention, the request to the scheduler is generated by the auxiliary transmitter.

Further in accordance with at least one embodiment of the present invention, the multi-carrier communication system comprises a multi-user communication system.

Still further in accordance with at least one embodiment of the present invention, the configuring the interference canceller also comprises providing an empty region detector which triggers the interference canceller upon detection of the sub-region.

Additionally in accordance with at least one embodiment of the present invention, each noise injector has dynamically configurable noise parameters and wherein the signal manipulator also comprises a noise parameter computer operative to dynamically compute the noise parameters.

Further in accordance with at least one embodiment of the present invention, the configurable noise parameters define frequency bands of the noise.

Additionally in accordance with at least one embodiment of the present invention, the spatial nulling device includes a weighted antenna summation functionality operative to compute a weighted sum of signals received by the plurality of antennae wherein the weighting is performed in accordance with a plurality of weighting coefficients corresponding in number to the plurality of antennae, and wherein the noise parameters computer is operative to use the plurality of weighting coefficients to dynamically compute the noise parameters.

Further in accordance with at least one embodiment of the present invention, using the scheduler includes using the signal manipulator to manipulate the received signal so as to prevent the scheduler from allocating the empty sub-region to any of the data transmissions.

It is appreciated that embodiments of the invention are typically more useful to the extent that the signal is a wideband signal.

Cancelling spatial interference typically involves reduction of spatial interference rather than total elimination thereof.

Also provided, in accordance with at least one embodiment of the present invention, in a multi-carrier communication system including a receiver, at least one transmitter transmitting a multi-carrier signal to the receiver, an interference canceller for cancelling spatial interference and a scheduler which is operative, for each individual time frame along a temporal axis, to allocate to various data transmissions, respective portions of a time-frequency region defined over the individual time frame, the multi-carrier signal defining a multiplicity of carriers together spanning a frequency band; is apparatus for adapting the interference canceller to the interference, including apparatus for activating the scheduler to reserve at least one empty sub-region within the time-frequency region by allocating only portions external to the sub-region to each of the data transmissions; and apparatus for configuring the interference canceller by deriving, from signal content in the empty sub-region, at least one interference-dependent parameter of the interference canceller's operation.

Further in accordance with at least one embodiment of the present invention, the communication signal comprises a multi-user communication signal.

Still further in accordance with at least one embodiment of the present invention, the subset of frequency bands in which the spatial nulling device is more effective comprises frequencies satisfying a predefined criterion based on at least the estimated reduction of the at least one spatial component of the received signal at the frequencies.

Additionally in accordance with at least one embodiment of the present invention, the subset of frequency bands in which the spatial nulling device is more effective comprises frequencies satisfying a predefined criterion based on at least the estimated signal to interference ratio of the cleaner signal at the frequencies.

Still further in accordance with at least one embodiment of the present invention, the using the scheduler comprises configuring the scheduler to reserve the at least one empty sub-region by allocating only the portions external to the sub-region to each of the data transmissions.

Further in accordance with at least one embodiment of the present invention, the using the scheduler comprises generating a request to the scheduler for allocation of a sub-region within the time-frequency region to an auxiliary transmitter; employing the scheduler to accede to the request by allocating at least one individual sub-region to the auxiliary transmitter; and refraining from transmitting within the individual sub-region.

Further in accordance with at least one embodiment of the present invention, the generating a request to the scheduler comprises generating the request by the auxiliary transmitter.

Still further in accordance with at least one embodiment of the present invention, the cleaner signal is cleaner than each of the plurality of received signals.

Additionally in accordance with at least one embodiment of the present invention, the system also comprises a scheduler which is operative, for each individual time frame from among at least one time frame defined along a temporal axis, to allocate to the at least one data transmission, respective portions of a time-frequency region defined over the individual time frame; and to cause the at least one data transmission to be more concentrated in a subset of frequency bands including manipulating a derivative of the received signals so as to cause the scheduler to allocate the at least one data transmission to be more concentrated in a subset of frequency bands in which the spatial nulling device is more effective and to be less concentrated in frequency bands which do not belong to the subset of frequency bands.

Also in accordance with at least one embodiment of the present invention, the signal manipulator comprises a programmable band limited noise injector device which adds noise to a signal derived from a signal received by at least one of the antennae such that noise is added only to frequency bands outside the subset and not to frequency bands inside the subset.

Further in accordance with at least one embodiment of the present invention, the spatial nulling device receives signals from the antenna array and feeds a signal to the signal manipulator, and the signal derived from the signal received by the at least one of the antennae comprises an output signal generated by the spatial nulling device.

Still further in accordance with at least one embodiment of the present invention, the manipulating includes manipulating a derivative of the received signal so as to cause the scheduler to allocate the at least one data transmission such that the data transmission is more concentrated in a subset of frequency bands in which the spatial nulling device is more effective and is less concentrated in frequency bands which do not belong to the subset of frequency bands.

Further in accordance with at least one embodiment of the present invention, the method also comprises providing a scheduler which is operative, for each individual time frame from among at least one time frames defined along a temporal axis, to allocate to the at least one data transmission, respective portions of a time-frequency region defined over the individual time frame, and wherein the manipulating includes manipulating a derivative of the received signal so as to cause the scheduler to allocate the at least one data transmission such that the data transmission is more concentrated in a subset of frequency bands in which the spatial nulling device is more effective and is less concentrated in frequency bands which do not belong to the subset of frequency bands.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

Certain embodiments of the present invention are illustrated in the following drawings:

FIGS. 1 and 2 each are a structure of an interference canceller as known in the art. FIGS. 3a and 3b each are an illustration of spatial gain pattern of the combined signal produced by summer 148 of FIG. 2.

FIG. 4 is an illustration of the combined signal frequency response of the example of FIG. 3A at the spatial angle of 0 degrees.

FIG. 11*a* is a prior art graph illustrating an example of a wideband multicarrier desired signal, comprising many carriers over frequencies 300.

FIGS. 5*a*-5*b*, 6*a*-6*b*, 8*a*-8*b*, 9*a*-9*d*, 10*a*-10*c* and 16*a*-16*c* are simplified functional block diagram illustrations of interference cancelling systems for multicarrier communication applications, constructed and operative in accordance with certain embodiments of the present invention and characterized in that a spatial nulling device generates a cleaner signal by reducing at least one spatial component of interference and a signal manipulator manipulates a derivative of a received signal so as to cause at least one data transmission to be more concentrated in a subset of frequency bands in which the spatial nulling device is more effective and to be less concentrated in frequency bands which do not belong to that subset of frequency bands. In particular:

FIG. 5*a* illustrates a method for spatial nulling according to one embodiment of the present invention.

FIG. 5*b* illustrates a system for spatial nulling according to another embodiment of the present invention similar to that of FIG. 5*a* except that the signals from the antenna array 102 are first fed into spatial nulling means 104, and its output is then fed into the signal manipulator 200.

FIG. 6*a* illustrates an example of a first embodiment of the system described in FIG. 5*a*.

FIG. 6*b* illustrates an example implementation of the system of FIG. 5*b*. In this embodiment, the signal manipulator 200 of FIG. 5*b* comprises a programmable BPF (Band-Pass-Filter), FIG. 8*a* illustrates another example implementation of the system of FIG. 5*a*, in which the signal manipulator 200 of FIG. 5*a* comprises programmable band limited noise injectors.

FIG. 8*b* illustrates an example of a second embodiment of the method described in FIG. 5*b* in which the signal manipulator 200 of FIG. 5*b* comprises programmable band limited noise injectors.

FIG. 9*a* illustrates a further embodiment of FIG. 6*a*. In this embodiment, spatial nulling means 104 comprises a weighted antenna summation.

FIG. 9*b* illustrates a further embodiment of FIG. 6*b* in which spatial nulling means 104 comprises a weighted antenna summation.

FIG. 9*c* illustrates a further embodiment of FIG. 8*a* in which spatial nulling means 104 comprises a weighted antenna summation.

FIG. 9*d* illustrates another possible implementation of FIG. 8*b* in which spatial nulling means 104 comprises a weighted antenna summation, FIG. 10*a* illustrates another embodiment of the present invention which can, if desired, be combined with the embodiment of FIG. 6 or of FIG. 8

FIG. 10*b* illustrates yet another embodiment of the present invention. similar to the embodiment of FIG. 5*b*, except that the signal manipulator 200 dynamically designs the frequency selective method according to some quality measurements performed on the actual signal that are provided by the signal manipulator FIG. 10c illustrates still another embodiment of the present invention which is similar to the embodiments of FIGS. 5b and 10b, except that the signal manipulator 200 dynamically designs the frequency selective method according to some quality measurements performed on the actual signal that comes out of the spatial nulling means 104.

FIGS. 16A-16C illustrate alternative embodiments of the present invention which include a scheduler.

Figure 6A:
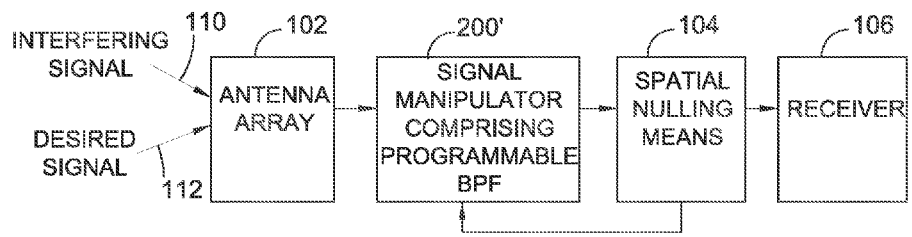
Figure 6B:
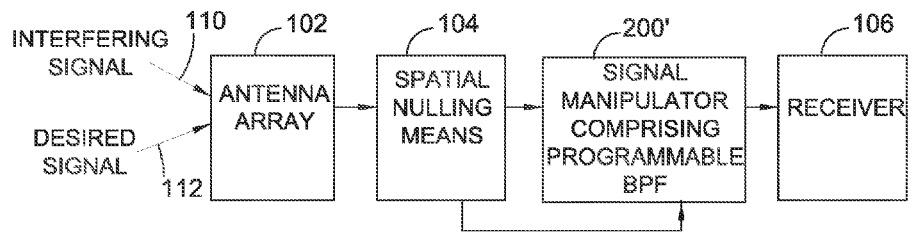
Figure 7:
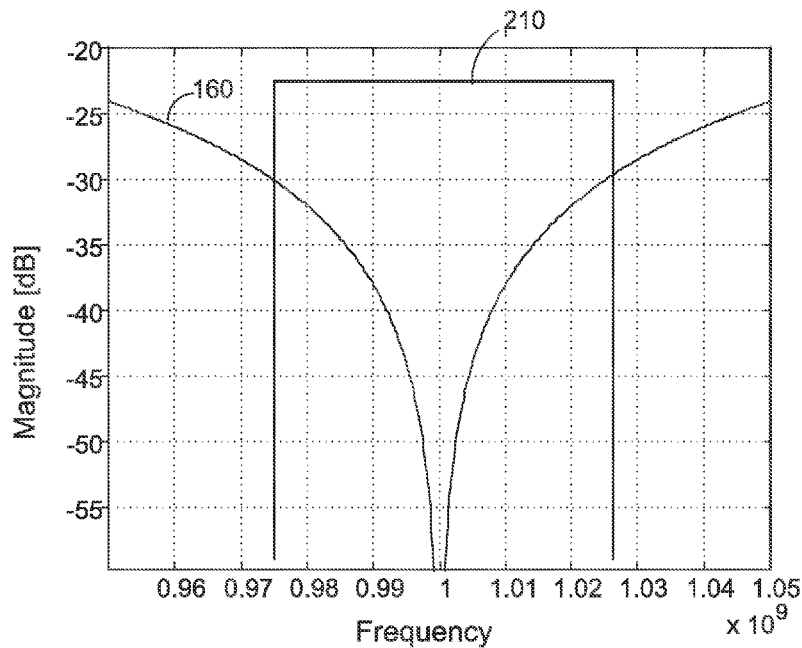
FIGS. 7, 11b and 11c are graphs useful in understanding certain embodiments of the present invention.

In particular:

FIG. 7 illustrates an example of the frequency response of the BPF of FIG. 6a or FIG. 6b.

Figure 11A:
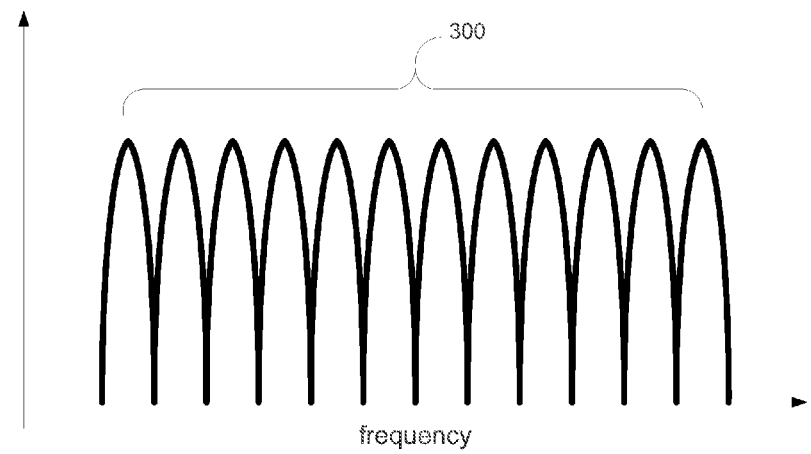
Figure 11B:
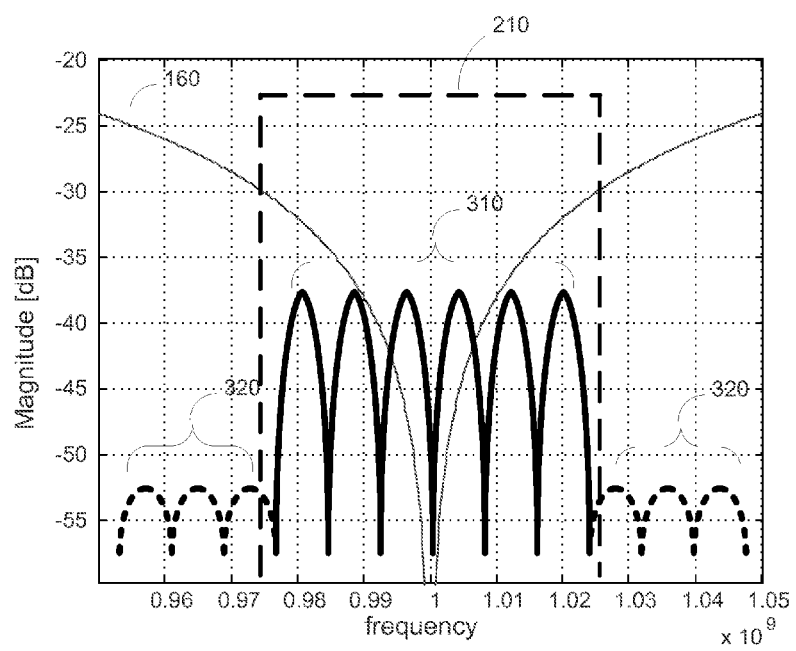

FIG. 11b is a graph illustrating an example of the output of the method described above with reference to FIG. 6a, FIG. 6b, FIG. 7, FIG. 9a and FIG. 9b.

Figure 11C:
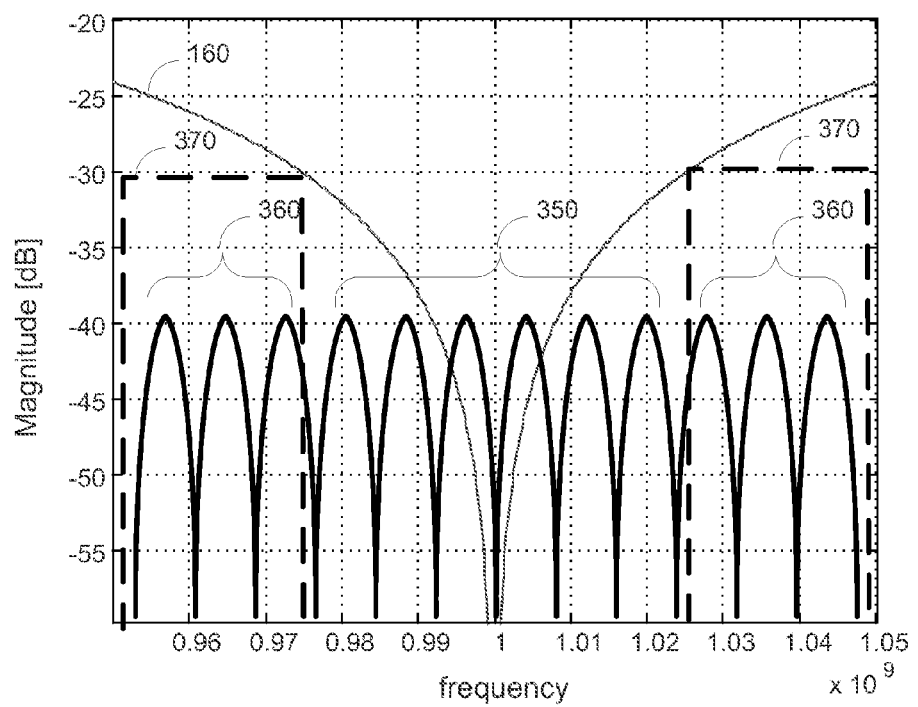

FIG. 11c illustrates an example of the outcome of the method described above with reference to FIGS. 8a-8b, 9c-9d.

Figure 12A:
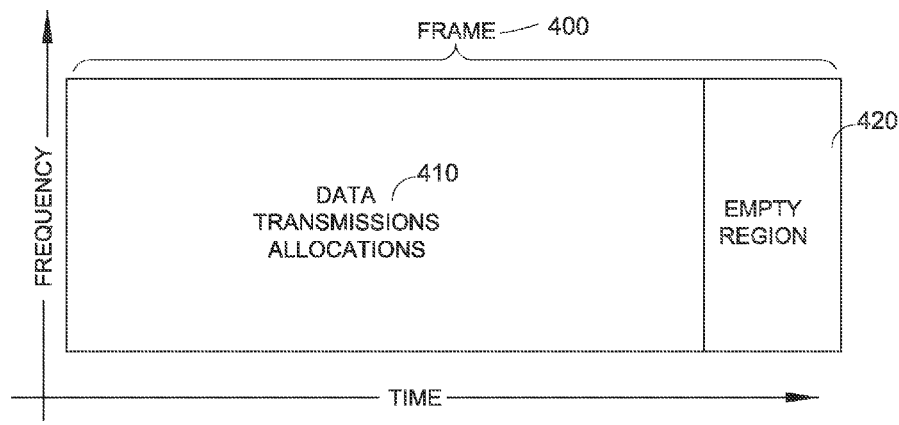
Figure 12B:
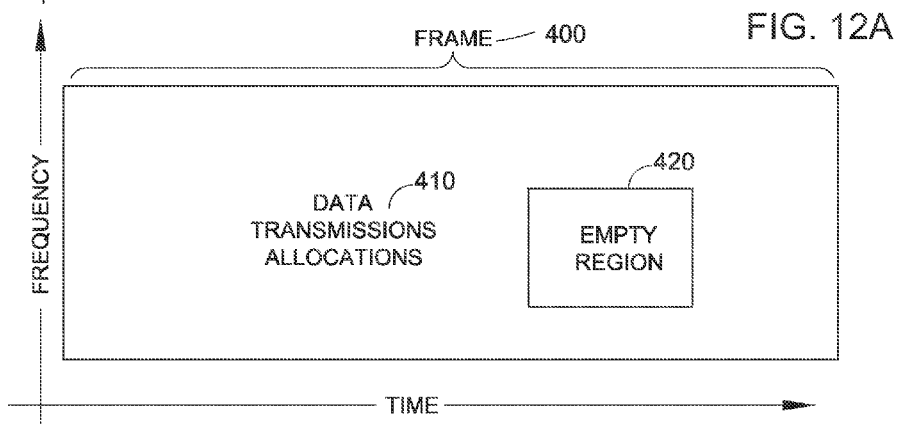
Figure 12C:
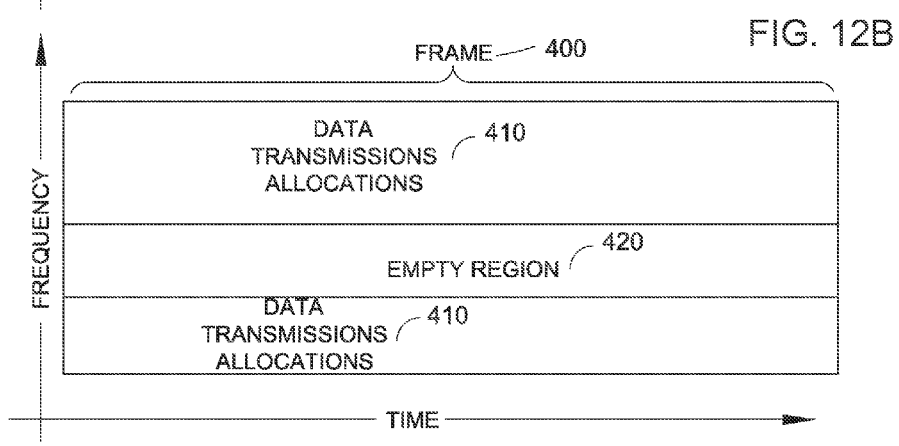

FIGS. 12a-12c are diagrams of methods for allocation of an empty region within a frame provided in accordance with certain respective embodiments of the present invention.

FIGS. 13a-13c and 15a-15c are simplified functional block diagram illustrations of interference cancelling systems for multicarrier communication applications, constructed and operative in accordance with certain embodiments of the present invention and characterized in that adaption of an interference canceller is provided, including using a scheduler to reserve, e.g. according to the methods of FIGS. 12a-12c, at least one empty sub-region within the time-frequency region by allocating only portions external to the sub-region to each of the data transmissions; and configuring the interference canceller by deriving, from signal content in the empty sub-region, at least one interference-dependent parameter of the interference canceller's operation.

Figure 14:
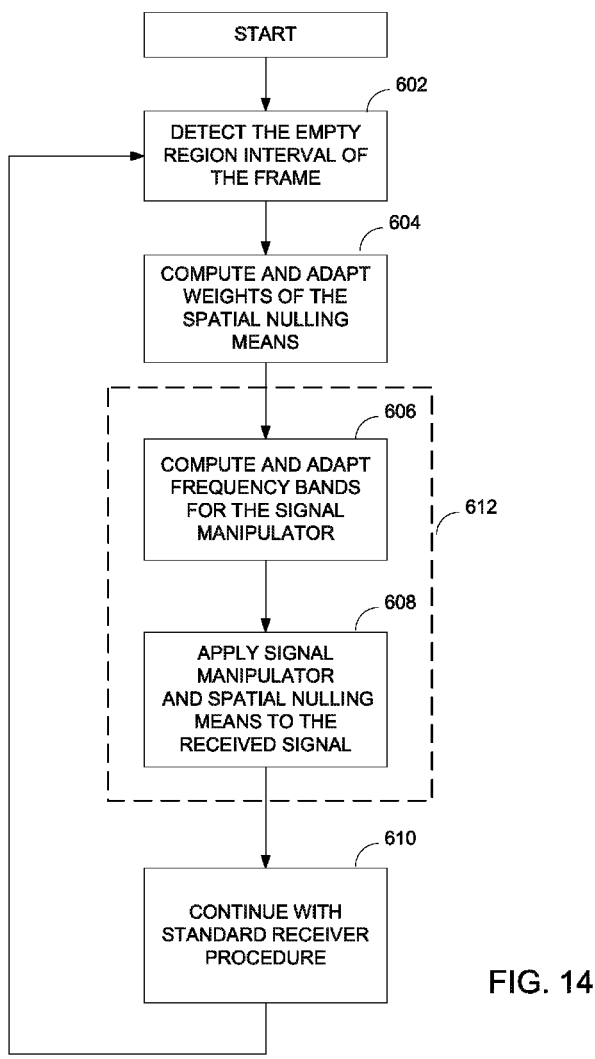

FIG. 14 is a simplified flowchart operation of a method for empty sub-region reservation which may be a method of operation for certain of the systems shown and described above.

DETAILED DESCRIPTION OF CERTAIN EMBODIMENTS

Figure 5A:
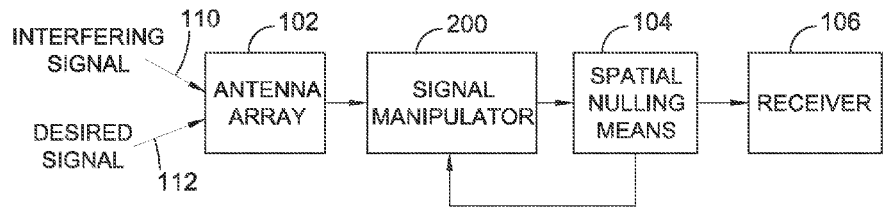

FIG. 5a illustrates a method for spatial nulling according to one embodiment of the present invention. The desired signal 112 is a wideband multicarrier signal. The interfering signals (one or more) 110 may be of the same characteristics as the desired signal, i.e. multicarrier signals of the same bandwidth and frequencies. Alternatively, interfering signals 110 may be of some other type, or have some other bandwidth, or even be some narrowband interferers. The desired signal 112 and the interfering signals 110 are received by the antenna array 102. The outputs of the antenna array 102 are fed into a signal manipulator 200, which preferably performs some frequency dependent or frequency selective actions on the signals. Some examples of this signal manipulator are described hereinafter with reference to FIG. 6a and FIG. 8a. After the signals from the antennas are processed by the signal manipulator 200, they are fed into the spatial nulling means 104.

Figure 1:
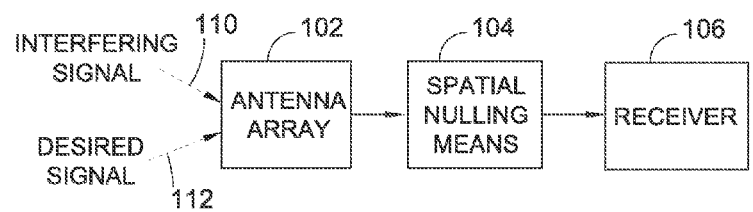
FIGS. 1, 2, 3a-3b, 4 and 11a are prior art illustrations useful in understanding the background of the present invention. In particular.
Figure 2:
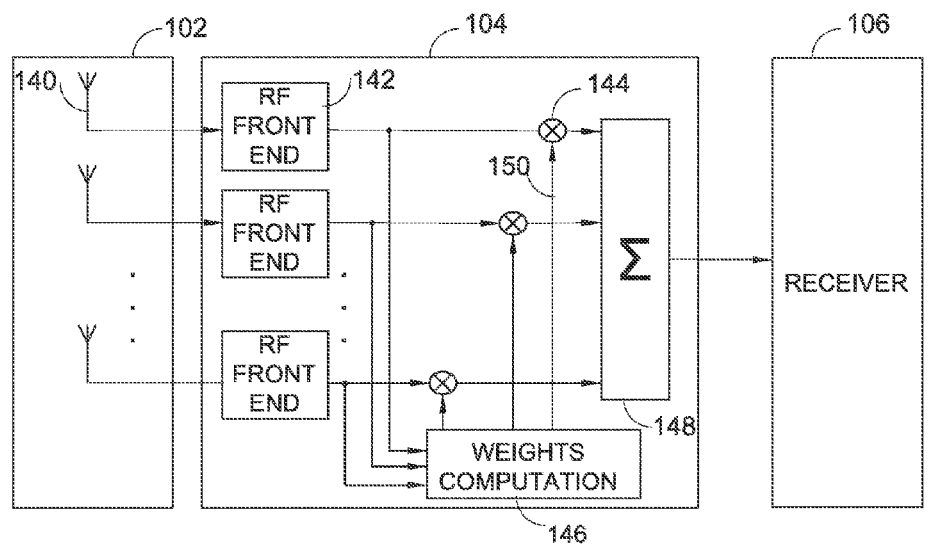

An example for the spatial nulling means may be the one described above with reference to FIG. 2, i.e. comprised of a weights computation, a multiplier, and a combiner. Spatial nulling is well known in the art, e.g. as described in the above-referenced publication by Hafeth Hourani, Chris Loadman et al. The purpose of the signal manipulator 200 is to concentrate the transmitted data information onto carriers within the desired bandwidth portion, which are the frequencies where the spatial nulling means 104 performs better, i.e. the null depth is deep enough. This is done by applying to the signals, a frequency dependent or frequency selective method for rendering undesired frequencies useless for the receiver, thereby to cause the communication system to refrain from allocating data transmissions over these frequencies.

In the case of a scheduler residing at the local side, the receiver 106 may detect the useless frequencies, and report them to the local scheduler, which in turn does not allocate data transmissions over these frequencies, and sends its allocation table to the remote transmitter (this is done using the opposite communication link). In the case of a scheduler residing at the remote side, the receiver may detect the useless frequencies, and report them to the remote scheduler using the opposite communication link. The remote scheduler then does not allocate data transmissions over these useless frequencies.

An advantage of certain embodiments described above is that no modifications need be made to the receiver 106, and no special interfaces are needed to or from the receiver 106, thus allowing to apply this method to a standard receiver.

Another advantage is that the useless frequencies are effectively blocked and masked to the receiver 106. This is very effective when the interferer signal is not stationary (for example, the interferer signal goes on and off, as likely happens in communication signals). Without blocking these frequencies, the scheduler would have allocated data transmissions onto these frequencies while the interferer signal was "off", and the communication system would have failed once the interferer signal went "on".

In the embodiment described above, the signal manipulator 200 is configured according to the frequency response that came out of the spatial nulling means 104. Optionally, the configuration is effected in a set-up stage, in which first the spatial nulling means 104 is tuned and determines its spatial response including the spatial angles in which nulling is made, and then the signal manipulator 200 is configured accordingly. Alternatively, the tuning of the spatial nulling means 104 followed by the configuration of the signal manipulator 200 are performed periodically during normal operation. For example, in the case of a WiMAX or LTE it may be performed every frame, or every several frames. According to a further alternative, the tuning of the spatial nulling means 104 followed by the configuration of the signal manipulator 200 is performed per request from the system controller due to some criterion such as but not limited to detection of change in interferers.

Figure 3A:
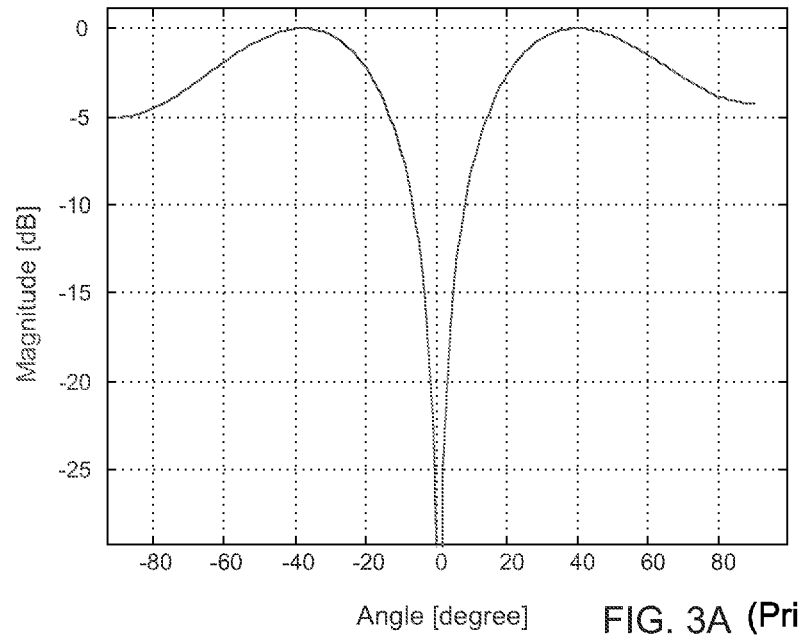
Figure 3B:
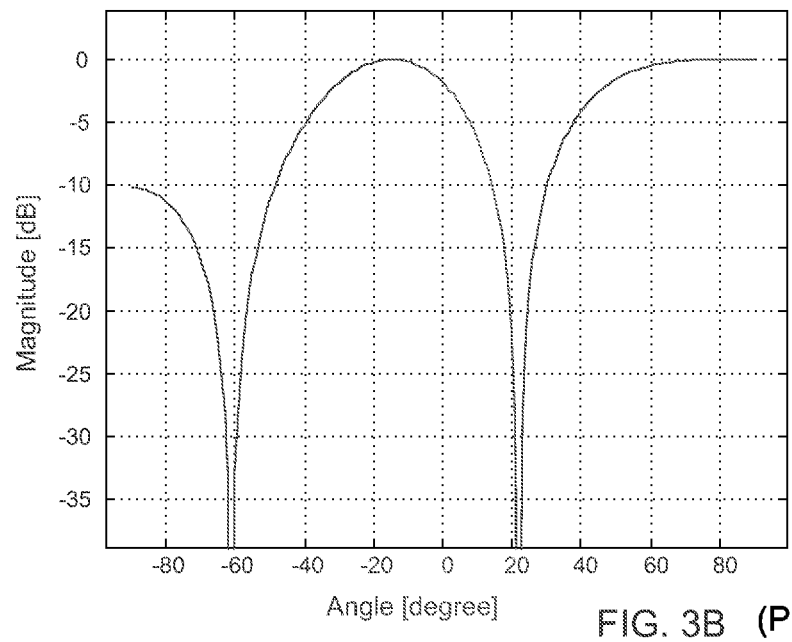
Figure 4:
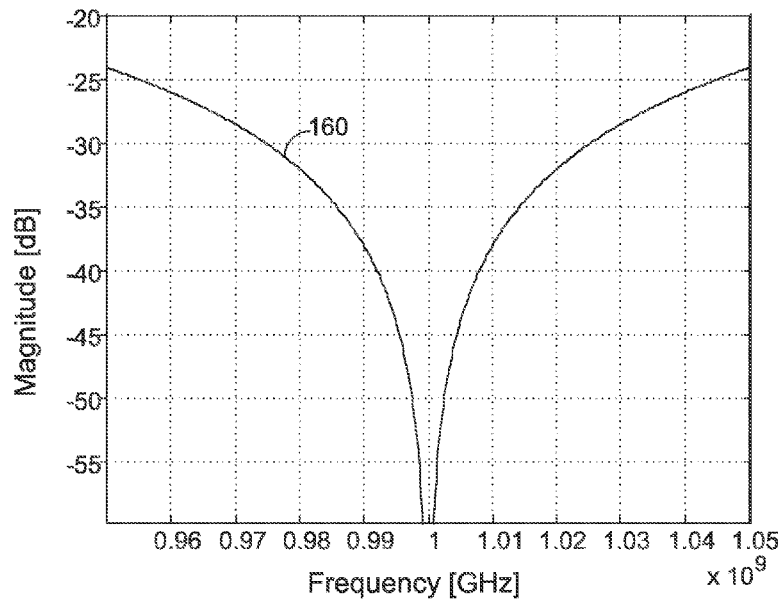

Optionally, configuration is effected by passing the computed weights of the spatial nulling means 104 to the signal manipulator 200, which computes the frequency response and the nulling capabilities as a function of frequency, at the desired spatial angle of the null. According to a further alternative, the angle of the desired null is also passed from the spatial nulling means 104 to the signal manipulator 200, directing the signal manipulator 200 on which spatial direction to compute the frequency response. For example, the weights of the spatial nulling means 104 may be tuned to effect a spatial response as in FIG. 3a, causing a null at the spatial angle of 0 degrees. In this example, the frequency response at this spatial angle is computed by signal manipulator 200 to be the frequency response 160 shown in FIG. 4. Then, signal manipulator 200 considers this frequency response in light of the nulling requirements of the communication system, e.g. the required Signal to Interferer Ratio (SIR) in order for the communication system to operate properly, and determines the subset of frequency bands in which the spatial nulling is effective. Then, signal manipulator 200 applies to the signals a frequency dependant or frequency selective method for rendering undesired frequencies useless for the receiver, thereby to cause the communication system to refrain from allocating data transmissions over these frequencies, or to otherwise prefer to concentrate the data transmissions over the frequencies where the spatial nulling is effective. Examples of suitable frequency dependent schemes are described below with reference to FIG. 6a and FIG. 8a.

Alternatively, some other measures or data is passed from the spatial nulling means 104 to the signal manipulator 200, to enable it to determine the frequency dependent method. For example, the frequency response at the null direction may optionally be computed in the spatial nulling means 104, and passed to the signal manipulator 200. In another example, spatial nulling means 104 may compute the frequency response and also determine the subset of frequency bands in which the spatial nulling is effective, and pass the frequency values of this subset.

The embodiment described hereinabove with reference to FIG. 5a may be implemented in RF, IF or Baseband.

Figure 5B:
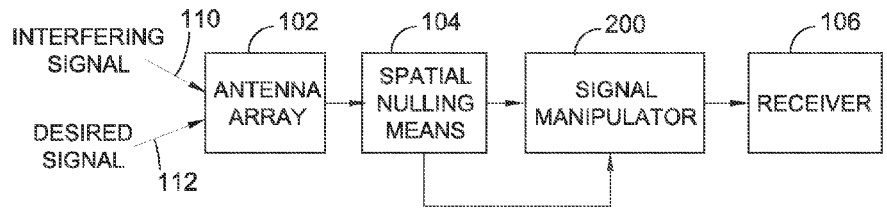

FIG. 5b illustrates a system for spatial nulling according to another embodiment of the present invention. This embodiment is similar to that of FIG. 5a except that the signals from the antenna array 102 are first fed into spatial nulling means 104, and its output is then fed into the signal manipulator 200. The advantage of the embodiment of FIG. 5b over the embodiment of FIG. 5a, for certain applications, is that signal manipulator 200 applies its frequency dependent function to only one signal coming out of the spatial nulling means 104, whereas in FIG. 5a signal manipulator 200 applies its frequency dependent function to each of the signals coming out of the antenna array. The embodiment described hereinabove with reference to FIG. 5b may be implemented either in RF, IF or Baseband.

Examples for frequency dependent methods to be used in accordance with the embodiment of FIG. 5b are described below with reference to FIG. 6b and FIG. 8b.

FIG. 6a illustrates an example of a first embodiment of the system described in FIG. 5a. In this embodiment, the signal manipulator 200 of FIG. 5a comprises a programmable BPF (Band-Pass-Filter), referenced 200' in FIG. 6a. More preferably, programmable BPF 200' comprises a multi-band BPF. Typically, signal manipulator 200' comprises such a BPF for each of its input signals, i.e. for each of the antennas in antenna array 102. The spatial nulling means 104 passes the designed weights, or other suitable data, to the programmable BPF 200', as described above with reference to FIG. 5a. The programmable BPF 200' implements a method which dynamically designs the appropriate filter coefficients including passing desired frequencies for which the nulling is good enough, and stopping the frequencies where the nulling is not good enough. Filter coefficients design may proceed in accordance with any suitable known method for designing a digital filter given a desired passband and a desired stopband. The passband is selected to include the frequencies for which the nulling is good enough, based on some predefined criterion of goodness. This criterion may be, for example, the required Signal to Interferer Ratio (SIR) at the receiver 106 input, in order for the communication system to operate properly. This method effectively blocks the receiver from using the frequencies where the nulling is not good enough according to the predefined criterion, and the scheduler does not allocate any data transmissions there, or otherwise prefers to concentrate the data transmissions over the frequencies where the nulling is good enough. The BPF typically implements the frequency dependent system described hereinabove with reference to FIG. 5a.

FIG. 6b illustrates an example implementation of the system of FIG. 5b. In this embodiment, the signal manipulator 200 of FIG. 5b comprises a programmable BPF (Band-Pass-Filter), referenced 200' in FIG. 6b. More preferably, programmable BPF 200' comprises a multi-band BPF. The description of the filter coefficients design and the frequency passband and stopband design may be the same as described above with reference to FIG. 6a. The difference from the embodiment of FIG. 6a is that only one signal is coming out of the spatial nulling means 104, thus only one BPF is implemented in signal manipulator 200', as described above with reference to FIG. 5b.

FIG. 7 illustrates an example of the frequency response of the BPF of FIG. 6a or FIG. 6b. The frequency response 160 of the combined signal is plotted, as described above with reference to FIG. 4. The frequency response 160 is shown at the desired null spatial direction. The programmable BPF 200' is configured to implement the frequency response 210, causing the useable frequencies to pass to the receiver, while stopping the useless frequencies. More preferably, frequency response 210 may be a multi-band BPF response.

FIG. 8a illustrates another example implementation of the system of FIG. 5a. In this embodiment, the signal manipulator 200 of FIG. 5a comprises programmable band limited noise injectors, referenced 200" in FIG. 8a. More preferably, programmable band limited noise injectors 200" each include multi-band noise injectors. Typically, signal manipulator 200" comprises such a noise injector for each of its input signals, i.e. for each of the antennas in antenna array 102. The spatial nulling means 104 passes the designed weights, or some other data, to the programmable band limited noise injectors 200", as described above with reference to FIG. 5a. Programmable band limited noise injectors 200" implement a method which dynamically generates multi-band band limited noise signals, and adds the noise signals to its input signals that came from the antenna array 102, correspondingly. The generated noise may be a band limited White Gaussian Noise (WGN) or it may be of another statistical type. Typically, the spectral power density of the noise signals is dynamically configured to be higher than the spectral power density of the received signals from the antenna array. The programmable band limited noise injectors 200" determines the frequency bands of the generated noise based on some predefined criteria. Such criteria may be, for example, the required Signal to Interferer Ratio (SIR) at the receiver 106 input, in order for the communication system to operate properly. This method effectively blocks the receiver from using the frequencies where the nulling is not good enough according to predefined criteria, and the scheduler does not allocate any data transmissions there, or otherwise prefers to concentrate the data transmissions over the frequencies where the nulling is good enough. The noise injectors may implement the frequency dependent system described hereinabove with reference to FIG. 5a.

FIG. 8b illustrates an example of a second embodiment of the method described in FIG. 5b. In this embodiment, the signal manipulator 200 of FIG. 5b comprises programmable band limited noise injectors, referenced 200" in FIG. 8b. More preferably, programmable band limited noise injectors 200" comprises multi-band noise injectors. The description of the noise injectors design and generation is the same as described above with reference to FIG. 8a. The difference from the embodiment of FIG. 8a is that only one signal emerges from the spatial nulling means 104, thus only one noise injector is implemented in signal manipulator 200", as described above with reference to FIG. 5*b*.

Figure 9A:
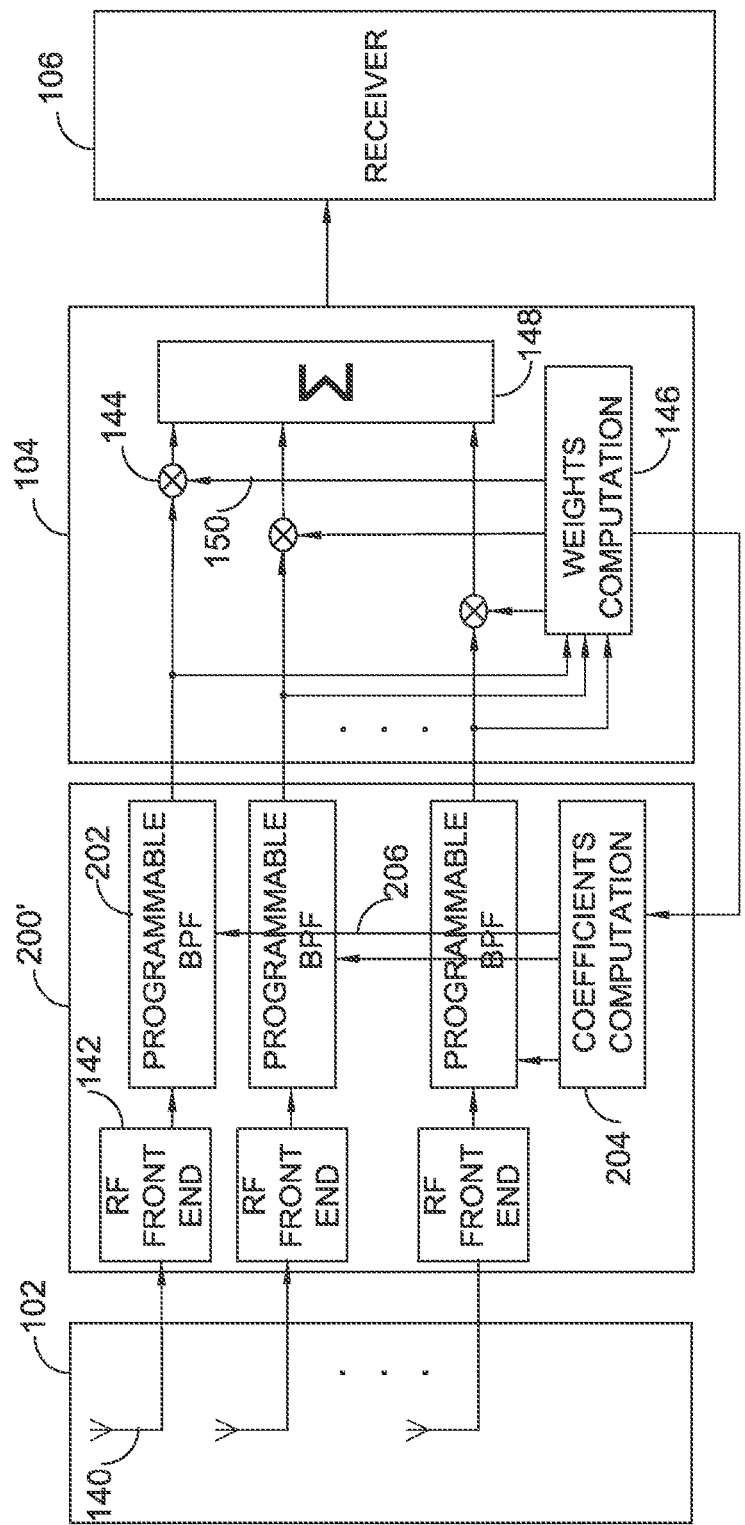

FIG. 9*a* illustrates a further embodiment of FIG. 6*a*. In this embodiment, spatial nulling means 104 comprises a weighted antenna summation, as described hereinabove with reference to FIG. 2. The programmable BPF 200' comprises an array of programmable Band Pass Filters 202, an array of RF front end 142, and a coefficient computation block 204. Each of the received signals from the antennas in antenna array 102 is fed into an RF front end 142, and then into a corresponding programmable BPF 202, which filters the signal. BPF 202 may optionally be a multi-band BPF. The outputs from the BPFs are fed into the spatial nulling means 104. The programmable BPF 202 is configured by coefficient computation unit 204, which computes coefficients 206, and passes the coefficients 206 to the programmable BPF 202. The coefficient computation unit 204 determines the coefficients 206 based on configuration from weights computation unit 146 and on predefined criteria, as described hereinabove with reference to FIGS. 5*a* and 6*a*. The embodiment described above may be implemented, mutatis mutandis, either in RF, IF or Baseband.

Figure 9B:
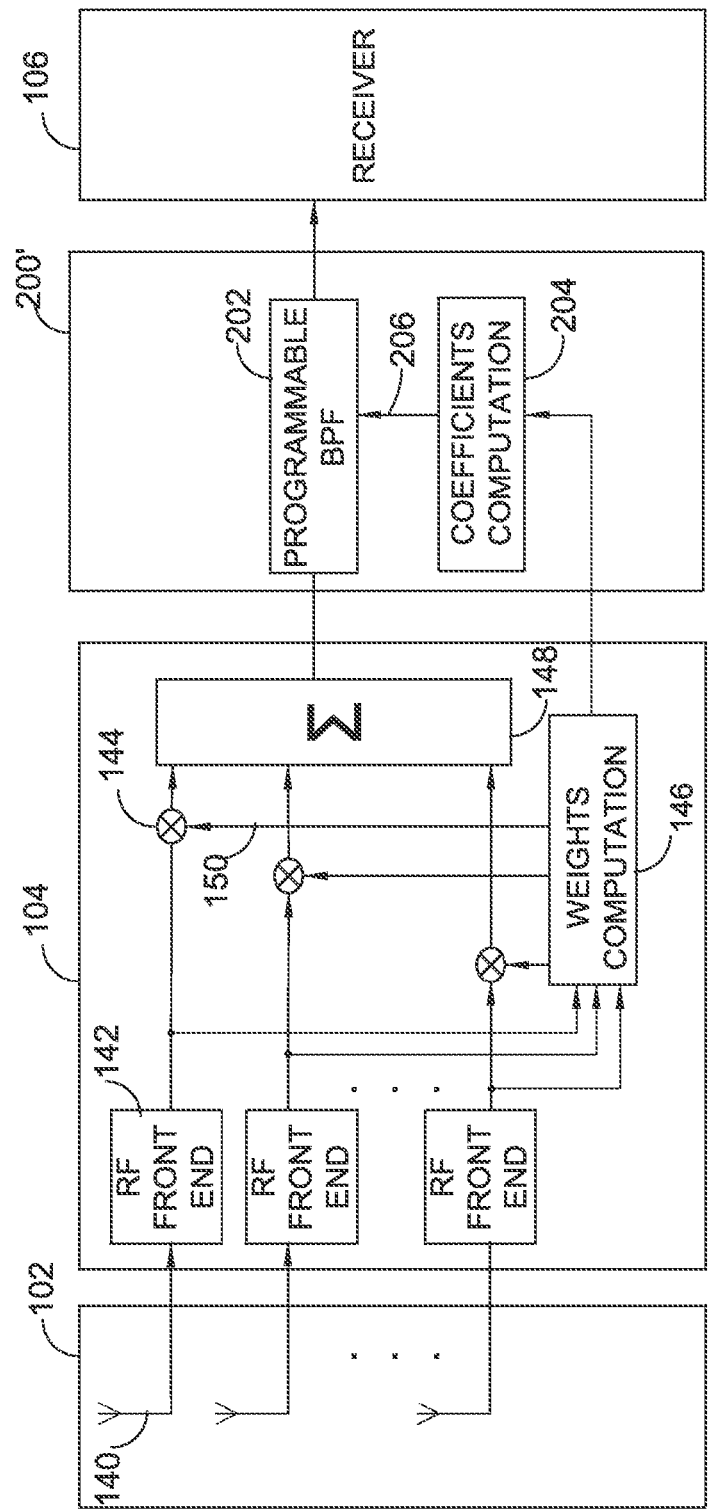

FIG. 9*b* illustrates a further embodiment of FIG. 6*b*. In this embodiment, spatial nulling means 104 comprises a weighted antenna summation, as described hereinabove with reference to FIG. 2. The programmable BPF 200' comprises a programmable Band Pass Filter 202 and a coefficient computation 204. BPF 202 may optionally be a multi-band BPF. Each of the received signals from the antennas in antenna array 102 is fed into an RF front end 142, and then is fed into the weighted antenna summation within spatial nulling means 104. The output from the spatial nulling means 104 is fed into the programmable BPF 202, which is configured by coefficient computation unit 204. Coefficient computation unit 204 computes coefficients 206 and passes them to the programmable BPF 202. The coefficient computation unit 204 determines the coefficients 206 based on configuration from weights computation unit 146 and on predefined criteria, as described hereinabove with reference to FIG. 5*b* and FIG. 6*b*. The embodiment described above may be implemented, mutatis mutandis, either in RF, IF or Baseband.

Figure 9C:
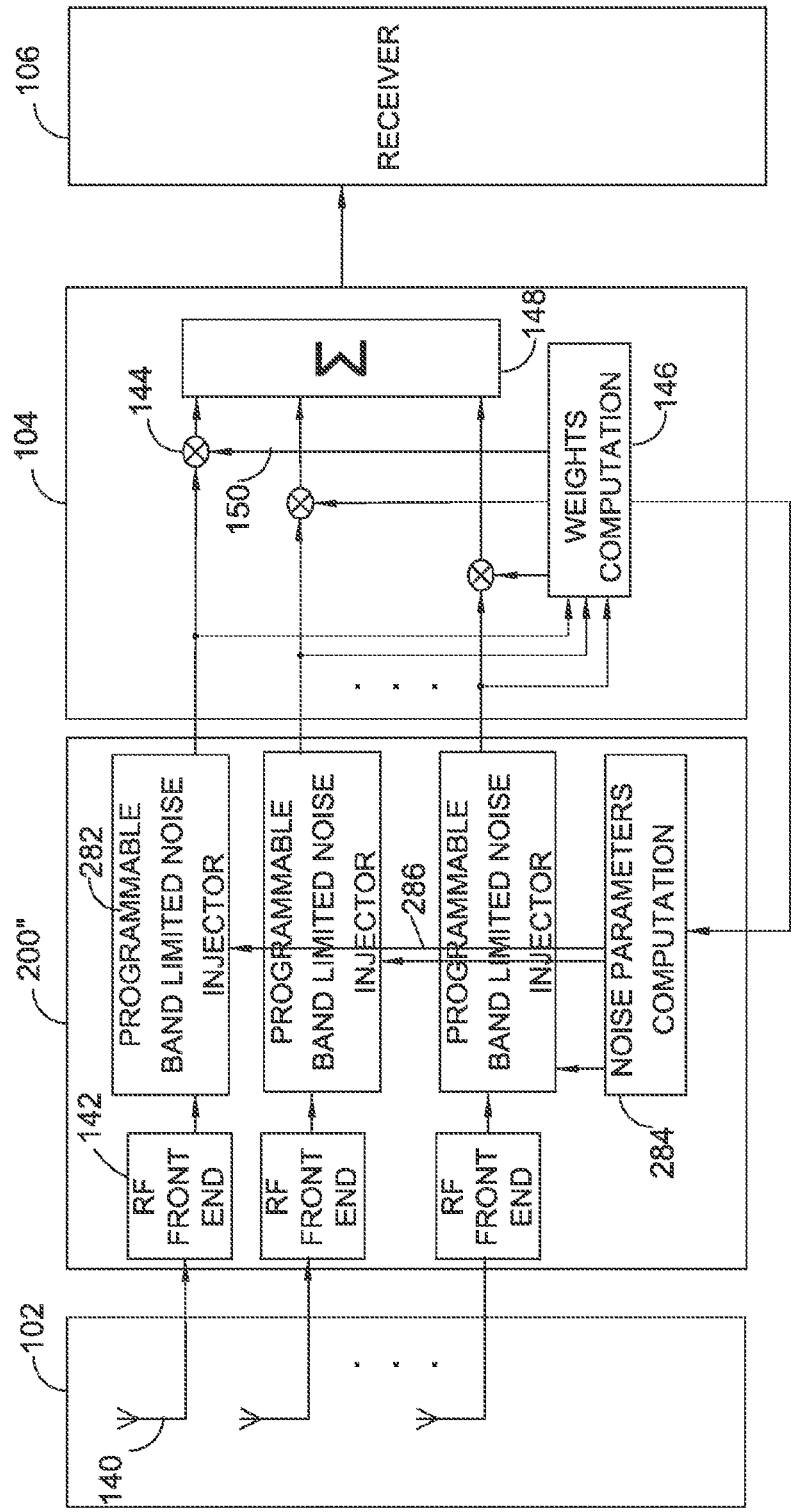

FIG. 9*c* illustrates a further embodiment of FIG. 8*a*. In this embodiment, spatial nulling means 104 comprises a weighted antenna summation, as described hereinabove with reference to FIG. 2. The band limited noise injectors 200" comprises an array of programmable band limited noise injectors 282, an array of RF front end 142, and noise parameters computation 284. Noise injector 282 may be a multi-band noise injector. Each of the received signals from the antennas in antenna array 102 is fed into an RF front end 142, and then into its corresponding programmable band limited noise injector 282, which adds band limited noise to the signals. The outputs from the noise injectors are fed into the spatial nulling means 104. The programmable band limited noise injectors 282 are configured by noise parameter computation unit 284, which computes noise parameters 286, and passes them to the programmable band limited noise injectors 282. Noise parameters 286 may comprise, for example, the frequency bands of the generated noise and its power. The noise parameter computation unit 284 determines the noise parameters 286 based on configuration from weights computation unit 146 and on predefined criteria, as described hereinabove with reference to FIG. 5*a* and FIG. 8*a*. The embodiment described above may be implemented, mutatis mutandis, either in RF, IF or Baseband.

Figure 9D:
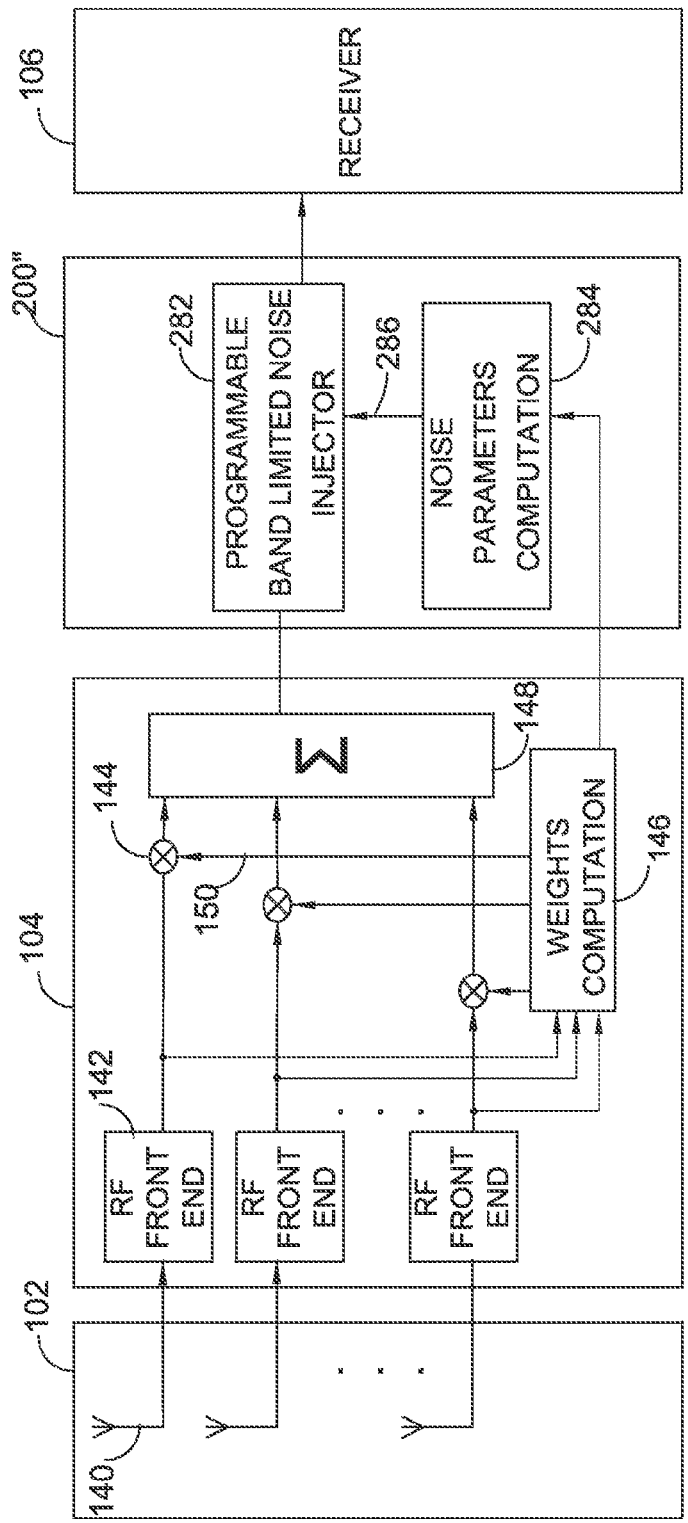

FIG. 9*d* illustrates another possible implementation of FIG. 8*b*. In this embodiment, spatial nulling means 104 comprises a weighted antenna summation, as described hereinabove with reference to FIG. 2. The programmable band limited noise injectors 200" comprise a programmable band limited noise injector 282 and a noise parameter computation unit 284. Noise injector 282 may optionally be a multi-band noise injector. Each of the received signals from the antennas in antenna array 102 is fed into an RF front end 142, and then is fed into the weighted antenna summation within spatial nulling means 104. The output from the spatial nulling means 104 is fed into the programmable band limited noise injector 282, which is configured by noise parameter computation unit 284. Noise parameter computation unit 284 computes noise parameters 286 and passes them to the programmable band limited noise injector 282. Noise parameters 286 may comprise, for example, the frequency bands of the generated noise and its power. The noise parameters computation unit 284 determines the noise parameters 286 based on configuration from weights computation unit 146 and on predefined criteria, as described hereinabove with reference to FIG. 5*b* and FIG. 8*b*. The embodiment described above may be implemented, mutatis mutandis, either in RF, IF or Baseband.

Figure 10A:
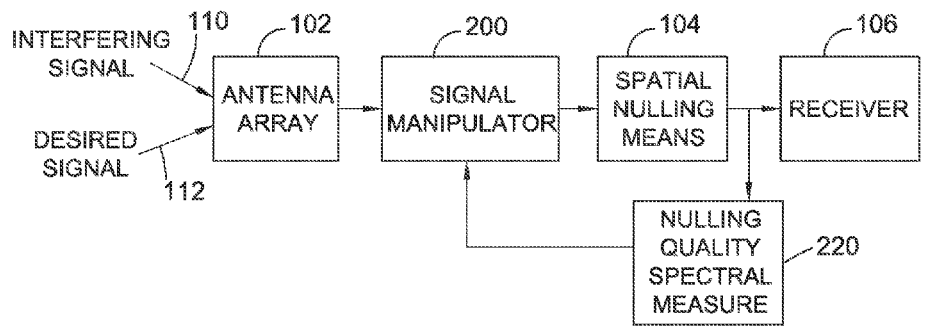

FIG. 10*a* illustrates another embodiment of the present invention which can, if desired, be combined with the embodiment of FIG. 6 or of FIG. 8 in that unit 200 may be in accordance with the teachings of FIG. 6, or FIG. 8, or any other suitable implementation. Whereas in the embodiments of FIGS. 5, 6 and 8, the signal manipulator 200 IS configured and operative based on the design parameters provided by 104, and acts like A "Feed Forward" mechanism, in FIG. 10, the signal manipulator 200 is configured and operative based on feedback from actual performance of the nulling means and acts like a "feedback mechanism" rather than a "feed forward" mechanism. The feedback mechanism typically includes measuring the actual signals, using unit 220. Block 200 may comprise a programmable BPF, or a programmable noise injector, similar to previous embodiments.

The embodiment of FIG. 10A may be similar to the embodiment of FIG. 5*a*, except that the signal manipulator 200 dynamically designs the frequency selective method e.g. according to quality measurements performed on the actual signal that outcomes of the spatial nulling means 104. This operation may be performed by the nulling quality spectral measure 220. For example, the energy of the actual signal may be measured over frequencies, and the actual null quality may be measured empirically. Optionally, this measure may be carried out by computing the FFT of the actual signal, or by other suitable known in the art methods for spectral estimation. The nulling quality measure 220 then configures, using feedback, the signal manipulator 200, thus allowing adaptation to the actual conditions. The signal manipulator 200 may optionally comprise a programmable BPF as in FIG. 6*a*, or programmable band limited noise injectors as in FIG. 8*a*.

The term "designing the frequency selective method" as used herein includes configuring the signal manipulator. For BPF-based embodiments as described herein, this may include computation of BPF coefficients whereas for noise injector-based embodiments, as described herein, this configuration may include computation of the noise parameters.

Figure 10B:
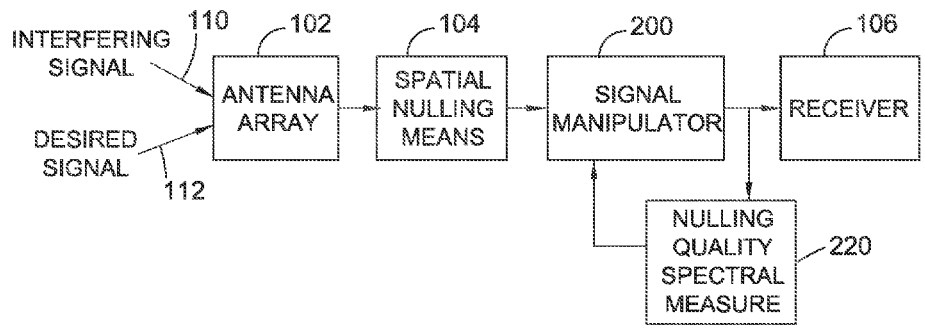

FIG. 10*b* illustrates yet another embodiment of the present invention. This embodiment is similar to the embodiment of FIG. 5*b*, except that in this embodiment the signal manipulator 200 dynamically designs the frequency selective method according to some quality measurements performed on the actual signal that are provided by the signal manipulator 200. This may be performed by the nulling quality spectral measure 220. For example, the energy of the actual signal may be measured over frequencies, and the actual null quality may be measured empirically. Optionally, this measure may be done by computing the FFT of the actual signal, or by any other known in the art method for spectral estimation. The nulling quality measure 220 then configures, using a feedback, the signal manipulator 200, thus allowing adaptation to the actual conditions. The signal manipulator 200 may optionally comprise a programmable BPF as in FIG. 6b, or programmable band limited noise injectors as in FIG. 8b.

Figure 10C:
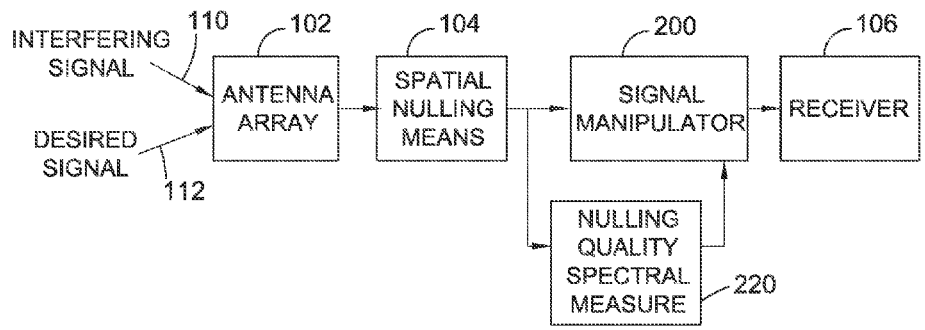

FIG. 10c illustrates still another embodiment of the present invention which is similar to the embodiments of FIGS. 5b and 10b, except that the signal manipulator 200 dynamically designs the frequency selective method according to some quality measurements performed on the actual signal that comes out of the spatial nulling means 104. This may be performed by the nulling quality spectral measure 220. For example, the energy of the actual signal may be measured over frequencies, and the actual null quality may be measured empirically. Optionally, this measure may be done by computing the FFT of the actual signal, or by other known in the art method for spectral estimation. The nulling quality measure 220 then configures the signal manipulator 200, thus allowing adaptation to the actual conditions. The signal manipulator 200 may optionally comprise a programmable BPF as in FIG. 6b, or programmable band limited noise injectors as in FIG. 8b.

FIG. 11a is a prior art graph illustrating an example of a wideband multicarrier desired signal, comprising many carriers over frequencies 300.

FIG. 11b is a graph illustrating an example of the output of the method described above with reference to FIG. 6a, FIG. 6b, FIG. 7, FIG. 9a and FIG. 9b. The programmable BPF 200' having the frequency response 210 causes frequencies 310 to pass to the receiver, and frequencies 320 to be blocked, because the null depth in frequencies 320 is not good enough, as shown by graph 160. Practically, frequencies 320 may not be totally blocked, but attenuated to a sufficient extent. Therefore, the scheduler does not allocate any data transmissions onto these frequencies.

FIG. 11c illustrates an example of the outcome of the method described above with reference to FIGS. 8a-8b, 9c-9d. The programmable band limited noise injectors 200" generate and inject a multi-band band-limited noise having the spectrum 370. Noise spectrum 370 spans over carrier frequencies 360 of the desired signal, causing receiver 106 to receive carrier frequencies 360 with a very low quality, i.e. very low SNR (Signal to Noise Ratio). Carrier frequencies 360 are those in which the null depth is not good enough, as shown by graph 160. Carrier frequencies 350, in which the null depth is good enough, are not affected by the noise injectors. Therefore, the scheduler refrains from allocating data transmissions onto frequencies 360, and prefer to concentrate data transmissions onto frequencies 350.

FIGS. 12a-12c illustrate an interference cancelling method constructed and operative in accordance with another embodiment of the present invention. In order for the multicarrier communication system to work properly, the data transmissions' allocations are made known to both the transmitter and the receiver. This is usually done by some protocol messages that the scheduler on one side sends to the other side, describing where and when data transmissions are placed, over time and frequency. For example, in WiMAX standard these protocol messages are called MAPs. FIG. 12a illustrates a frame 400 for the multicarrier transmission. Frame 400 is a time interval along the temporal axis. Data transmissions 410 are allocated within the frame 400. Data transmissions 410 may originate and be transmitted from one source, or alternatively may be transmitted from several different transmitters, for multi-user data allocations, like in the case of OFDMA.

In order to be able to adjust the spatial nulling means 104 efficiently, the method of FIGS. 12a-12c configures the scheduler to place an empty region 420 within the frame 400. In this empty region, no data transmissions are allocated by the scheduler. This empty region may be placed at the end of the frame duration, as illustrated in FIG. 12a, or at any other time within the frame as shown in FIGS. 12b and 12c, for example. The empty region may cover all the frequencies of the wideband transmission, and span only a portion of the frame duration, as in the example illustrated in FIG. 12a. For example, in WiMAX transmission, such a region is called a zone. Alternatively, the empty region may cover only a portion of frequencies, and span the whole frame duration, as in the example of FIG. 12c.

The empty region may also cover only a portion, either contiguous or fragmented, of frequencies, and may span over only a portion, either contiguous or fragmented, of the frame duration, as in the example of FIG. 12b. In LTE, such a region is called Resource Block (RB). Typically, the spatial nulling means 104 may perform its adaptive weight computations as is well known in the art, using the received signal in the empty region.

Conventional methods for adaptive weight computation are described inter alia in the following publications:

An Overview of Adaptive Antenna Systems, Hafeth Hourani, Helsinki University of Technology—section VI An Overview of Adaptive Antenna Technologies For Wireless Communications, Chris Loadman, Dr. Zhizhang Chen & Dylan Jorgensen, Dalhousie University—sections 3.1, 3.2, 3.3

Null-steering LMS Dual-Polarised Adaptive Antenna Arrays for GPS, W C Cheuk, M Trinkle & D A Gray, Journal of Global Positioning Systems (2005), Vol. 4, 5 No. 1-2: 258-267,—formula 2.2

Smart Antenna Design for Wireless Communication using Adaptive Beam-forming Approach, Susmita Das, National Institute of Technology, Rourkela, India—section III Smart Antennas, Lal Chand Godara, CRC Press—section 2.3; and Digital Beamforming in Wireless Communications, John Litva and Titus Kwok-Yeung Lo, Artech House—section 3.2.

The spatial nulling means may optionally detect and estimate the presence of the interferer signals, their directions, power or some other measure. The empty region enables spatial nulling means 104, the signal manipulator 200 and the nulling quality spectral measure 220, e.g. as described above, to adapt, compute and configure their parameters more accurately, because the only signals that are received within the empty region are the interferers 110, while the desired signal 112 is silent. Hence, the detection of the presence of an interferer, and measuring its power may be accurately performed by measuring the received power within the empty region. Computing the spatial nulling means weights by weights computation unit 146 yields more accurate results when performed over the interferer 110 solely, without the desired signal 112 which acts like a noise for the weights computation unit method 146. The spatial nulling means 104 and the signal manipulator 200 may be any one of the embodiments described hereinabove, specifically, but not limited to, one of the embodiments of FIGS. 5a-5b, 6a-6b, 8a-8b, 9a-9d, 10a-10c.

In a further embodiment, the empty region in the frame is controlled to be placed dynamically, e.g. according to the measured conditions, pre-determined configuration, and some decision logic. Optionally, the length in time and the bandwidth in frequency of the empty region, the provision of the empty region every frame or only once per several frames, and the place of the empty region within the frame, may be all configurable parameters, and may be controlled and adjusted dynamically. For example, if no interference is detected, the empty region size may be reduced, and it may be allocated once per several frames, in order to save throughput. Once interference is detected, the empty region may be enlarged to span over all frequencies in order to measure the interference and to adapt the weights more accurately, and also the empty region may be allocated on every frame in order to dynamically adapt to varying interferences.

In another embodiment, the scheduler is not configured directly to place an empty region 420 within frame 400. Instead, signal manipulator 200 is configured to block the signal over the desired empty region location in time and frequency. Signal manipulator 200 may optionally inject noise onto this region, or dynamically filter out this region. The receiver 106 measures the received signal quality over this region as very bad, thus the scheduler does not allocate any data transmissions onto this region during the next frame or several frames. This way the empty region is practically allocated, but without direct configuration of the scheduler. This is an advantage in case the scheduler is not accessible directly.

Figure 13A:
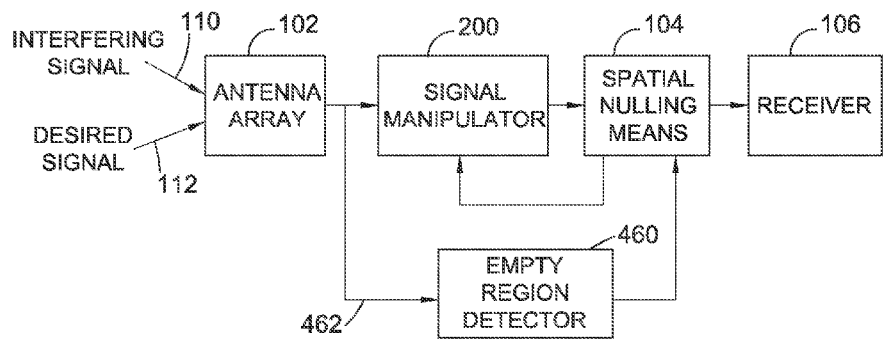
Figure 13B:
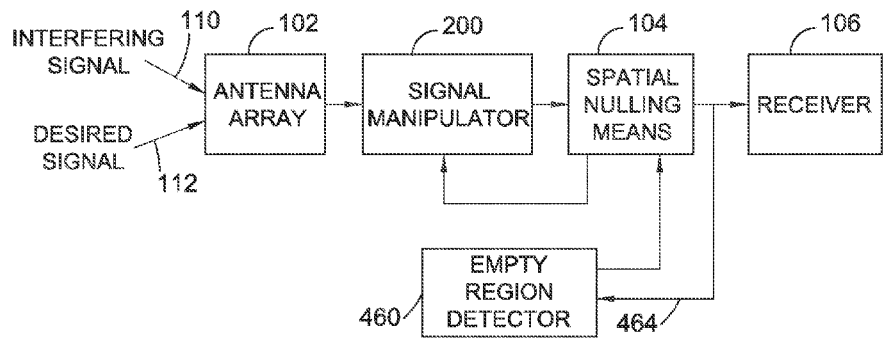
Figure 13C:
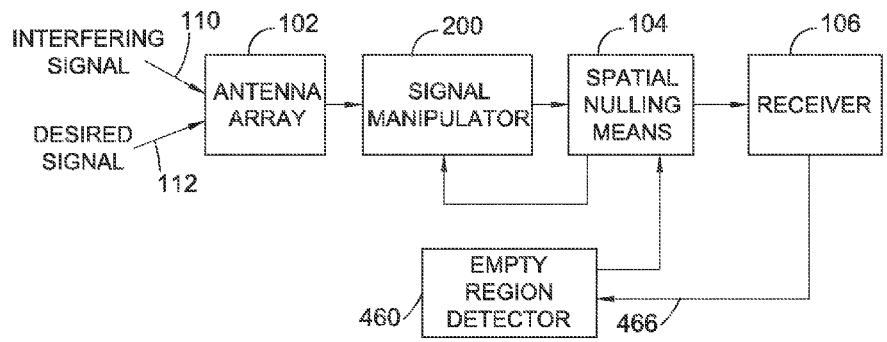

FIGS. 13a-13c illustrate modifications of the system of FIG. 12 which differ regarding the information which is fed into the empty region detector 460. The spatial nulling means 104 and the signal manipulator 200 may be any one of the embodiments described hereinabove, such as but not limited to any of the embodiments of FIGS. 5a-5b, 6a-6b, 8a-8b, 9a-9d, 10a-10c. Specifically, the order of the spatial nulling means 104 and the signal manipulator 200 may be reversed.

In FIG. 13a, the signals 462 from the antenna array 102 are fed into an empty region detector 460, which in turn detects the time-frequency existence and location of the empty region 420. The detection may be based on energy criteria or by any other detection criteria or method. For example, in the case of interferer signal 110 whose power is not too high relative to the power of the desired signal 112, a simple energy measurement may be performed on each frequency carrier of the multi-carrier transmission, and every symbol duration, which is the fundamental temporal unit of the multi-carrier signal. The measured energy within the empty region will be noticeably lower than the energy within other regions in the frame. More complex methods for the detection of the empty region may utilize cross-correlation computations between the received signal 462 and some predetermined reference signals.

Upon detection of the empty region, the detector 460 notifies and triggers the spatial nulling means 104 to compute and update its weights. Optionally, detector 460 also triggers the signal manipulator 200 to compute its parameters.

FIG. 13b illustrates another embodiment which is a variation on the embodiment of FIG. 13a in which the empty region detector 460 is fed with the cleaner signal 464 provided by the spatial nulling means 104. The advantage of this embodiment is that the detection of the empty region may be performed more accurately, because the input signal to the detector 460 contains less interferers' power, thus the empty region is more noticeable. The mutual operation of the spatial nulling means 104 and the empty region detector 460 may optionally be in an iterative-feedback manner, i.e. the detector 460 detects the empty region and triggers spatial nulling means 104 to compute weights, such that a cleaner signal is produced by the spatial nulling means 104, allowing detector 460 to detect the next coming empty region more accurately, and so forth.

FIG. 13c illustrates another variation on the embodiment of FIG. 13a in which the empty zone detector 460 is fed with information from the receiver 106. Optionally, the receiver 106 generates a synchronization signal that notifies when the empty region starts. Alternatively, the receiver sends some data describing where and when the empty region is placed.

FIG. 14 is a simplified flowchart illustration of a method of operation of the apparatus described above with reference to FIG. 13. Typically, upon setup, the scheduler is configured to place an empty region 420 within frame 400, and step 602 is entered. In step 602, the empty region detector 460 searches for the empty region 420. Upon detection of the empty region 420, step 604 is entered, in which and spatial nulling means 104 compute and adapt its weights. This is done by the weights computation unit 146, using the signals received over the empty region 420. After weights are computed, step 606 is entered, in which signal manipulator 200 determines the desired useful frequency bands, either by analyzing the computed weights which are passed to signal manipulator 200, e.g. as described above with reference to FIGS. 5a-5b, or alternatively by analyzing the nulling quality by nulling quality spectral measure 220, e.g. as described above with reference to FIGS. 10a-10c.

After the desired useful frequency bands are determined, signal manipulator 200 may adapt its frequency dependent method, either by coefficient computation unit 206 for the programmable BPF 202 e.g. as described above with reference to FIGS. 9a-9b, or alternatively by noise parameters computation 284 for the programmable band limited noise injector 282 e.g. as described above with reference to FIGS. 9c-9d. Then, step 608 is entered, in which the signal manipulator 200 method and the spatial nulling means 104 method are applied to the signals coming from the antenna array 102, generating a cleaner signal which is fed into the receiver 106. Then, in step 610, receiver 106 performs its standard receive procedures, and completes the reception of the frame. Step 602 may be optionally reentered either for each frame, or once per several frames, or upon a change in the quality of the reception of the desired signal. Steps 606 and 608 may be performed together at a single step 612.

Figure 15A:
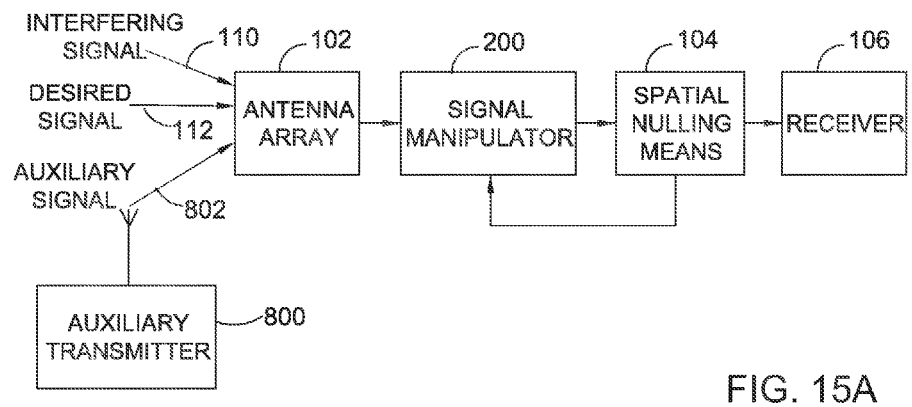
Figure 15B:
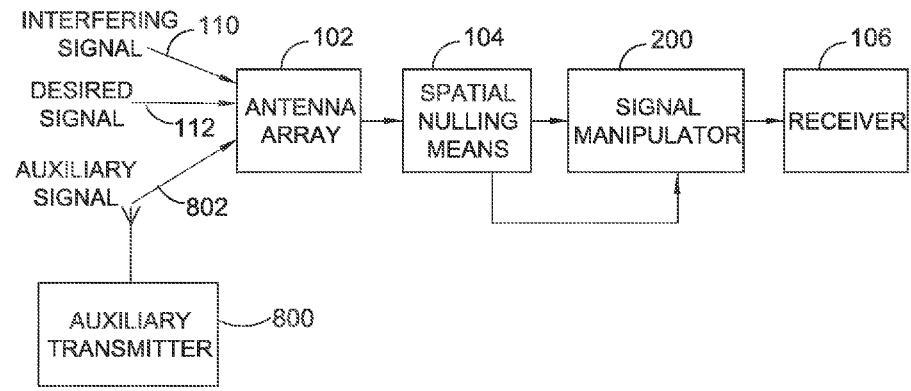
Figure 15C:
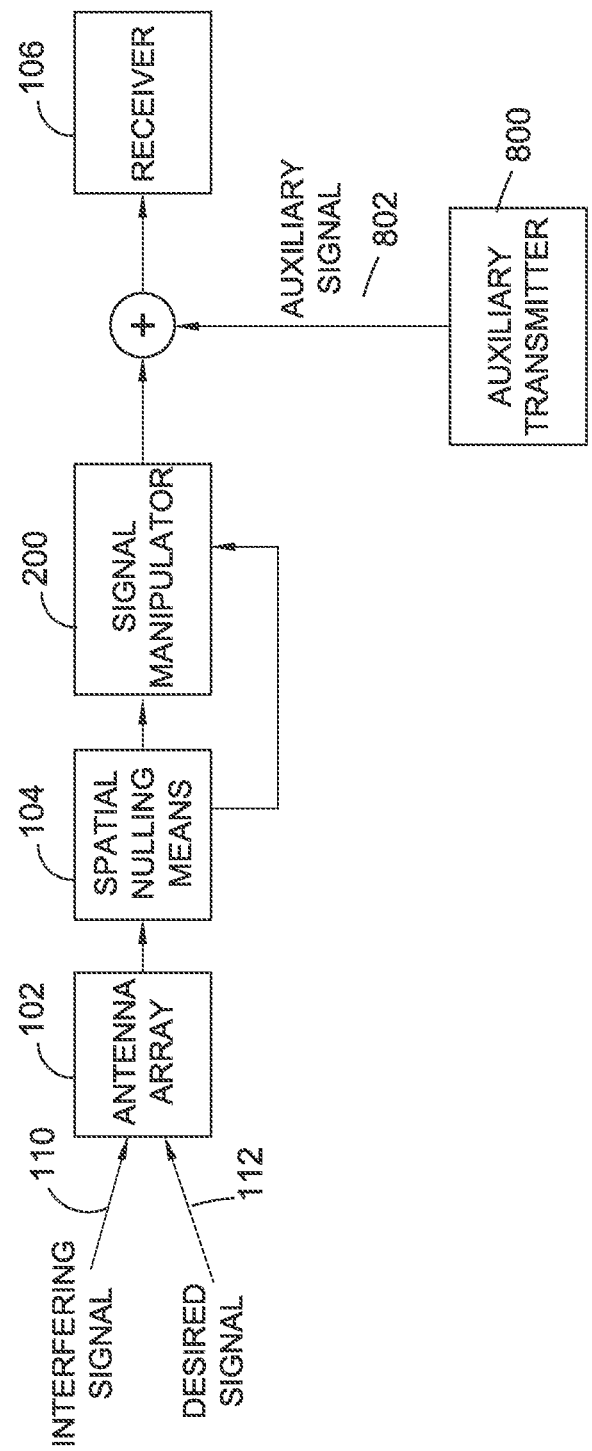

FIGS. 15a-15c illustrate three respective embodiments of another system for allocation of the empty region 420 described above with reference to FIG. 12. In these embodiments, the scheduler is not directly configured to allocate empty region 420. Instead, an auxiliary signal 802 is generated, in a manner described hereinbelow, indirectly causing the scheduler to allocate the empty region 420. In these figures, the spatial nulling means 104 and the signal manipulator 200 may be any one of the embodiments described hereinabove, such as but not limited to, one of the embodiments of FIGS. 5a-5b, 6a-6b, 8a-8b, 9a-9d, 10a-10c.

FIG. 15a illustrates an auxiliary transmitter 800 transmitting an auxiliary signal 802, which is received by antenna array 102 along with the other signals. Auxiliary transmitter 800 is a cooperative transmitter, configured to transmit an auxiliary signal 802 carrying a request to the scheduler for allocating an available region for the use of the auxiliary transmitter 800. The allocation request is sent using agreed protocol messages of the multi-carrier transmission. The scheduler, based on its priorities, allocates a region for the auxiliary transmitter 800, considering transmitter 800 as a regular transmitter asking for allocation.

Upon grant for transmission, the auxiliary transmitter 800 does not transmit any signals onto at least a portion of its allocated region, thus effectively causing an empty region 420. Thereby, the empty region is practically allocated, but without direct configuration of the scheduler. This is an advantage in the case that the scheduler is not accessible directly. The auxiliary transmitter 800 may be located at a place near antenna array 102, or at another place, far from antenna array 102. Alternatively, auxiliary signal 802 may be added after the antenna array 102, thus there is no need for the auxiliary transmitter 800 to transmit energy to the air.

Optionally, auxiliary transmitter 800 may be replaced by simulator generating the auxiliary signal 802, thus eliminating the need for a full transmitter device.

The embodiment of FIG. 15b is similar to the embodiment of FIG. 15a, except that the order of spatial nulling means 104 and the signal manipulator 200 is reversed.

The embodiment of FIG. 15c is similar to the embodiment of FIG. 15a, except that the auxiliary signal is added to the signal fed into the receiver 106, thus there is no need for the auxiliary transmitter 800 to transmit energy to the air.

Figure 16A:
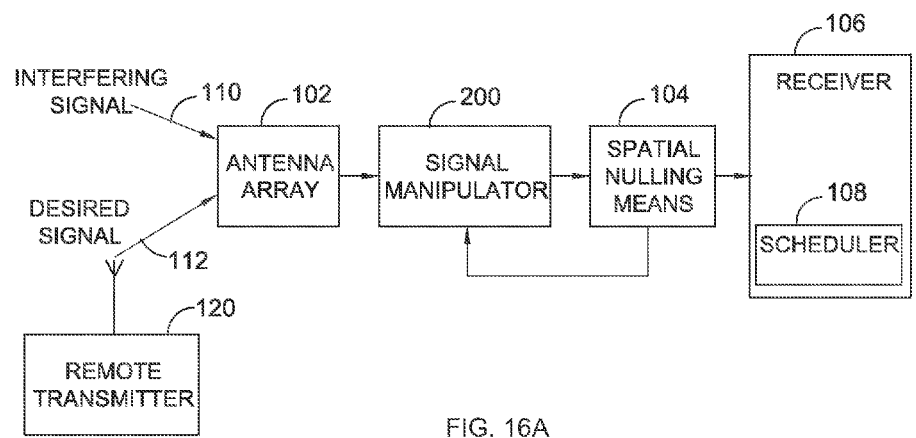
Figure 16B:
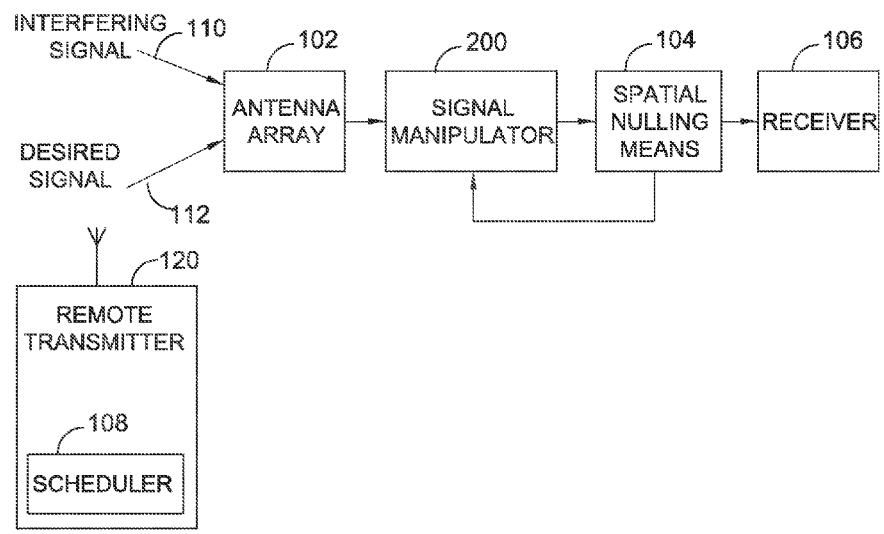
Figure 16C:
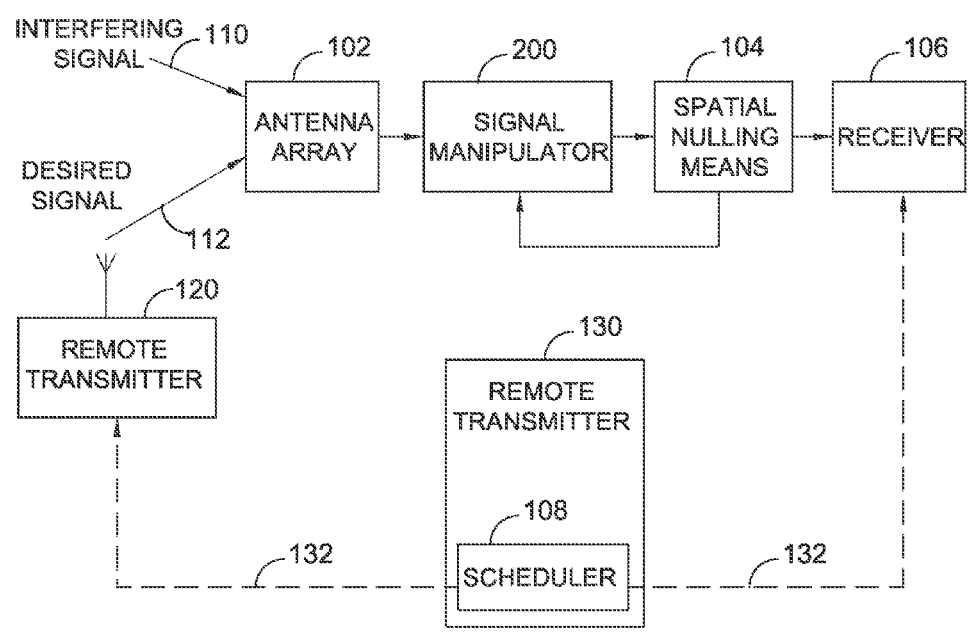

FIGS. 16A-16C illustrate alternative embodiments of the present invention which include a scheduler. FIGS. 16A-16C are based on the embodiment of FIG. 5a; it is appreciated that the embodiments of FIGS. 5B-10 and 13-15 may be modified similarly.

In FIG. 16a, scheduler 108 is in the receiver 106, or at the receiver side. The scheduler determines the data transmissions allocations over time/frequency, and configures the receiver accordingly. Also, the allocation is passed to the other side, i.e. to the remote transmitter, via the reverse communication link.

In FIG. 16b, scheduler 108 is in the transmitter 120, or at the transmitter side. The scheduler determines the data transmissions allocations over time/frequency, and configures the transmitter accordingly. Also, the allocation is passed to the other side, i.e. to the receiver, via the communication link e.g. via signal 112, at the start of each frame, describing allocations at the rest of the frame.

In FIG. 16c, the scheduler 108 is in a remote server 130, and is located neither at the transmitter, nor at the receiver. The scheduler determines the data transmissions allocations over time/frequency. The allocation is passed to both the receiver and the transmitter, and configures them accordingly. Allocation is passed via communication means 132, which could be any suitable communication means.

Regarding use of required Signal to Interferer Ratio (SIR) e.g. in the embodiments of FIGS. 5a, 6a and 8a, as described above, the appropriate level of SIR which may be employed is application specific since it typically depends on the physical layer (PHY) mode of operation, PHY configuration parameters and receiver design. For example, parameters that may affect determination of an appropriate SIR level include but may not be limited to the modulation order (e.g. QPSK, 16QAM, 64QAM etc.), the FEC (Forward Error Correction) method being used, the FEC rate, and the required BER (Bit Error Rate) at the receiver. The spatial nulling means affects the SIR by aiming for maximal reducing of the interferer power, while minimally reducing the desired signal power, hence aiming to enlarge the SIR. However, the nulling capabilities vary along frequencies, as described above with reference to FIG. 4. Frequency response 160 depicts the nulling capability as a function of frequency, at the spatial angle of the interferer. Hence, the SIR at the output of the spatial nulling means is frequency dependent. For some frequencies the null is deep enough, affecting a good enough SIR (i.e. at least the required SIR for appropriate operation of the receiver). For other frequencies, the null is not deep enough, causing SIR not to be good enough in the sense that it does not meet the required SIR for appropriate operation of the receiver.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A system for cancelling spatial interference associated with an original multi-carrier signal carrying at least one data transmission sent by a transmitter to an antenna array comprising a plurality of antennae and having a receiver operatively associated therewith, the system receiving a plurality of received signals respectively including the interference and the original signal as received by a respective individual antenna from among the plurality of antennae, the system comprising:
    a spatial nulling device for generating a cleaner signal by reducing at least one spatial component of said interference; and
    a signal manipulator operative to manipulate a derivative of said received signals so as to cause said at least one data transmission to be more concentrated in a subset of frequency bands in which the spatial nulling device is more effective and to be less concentrated in frequency bands which do not belong to said subset of frequency bands,
    wherein said signal manipulator comprises an array of programmable band limited noise injectors including a plurality of programmable band limited noise injectors corresponding in number to said plurality of antennae,
    wherein each noise injector adds noise to the signal received from the antenna corresponding to the noise injector, such that noise is added only to frequency bands outside the subset and not to frequency bands inside the subset.

2. A system according to claim 1 wherein said signal manipulator comprises a programmable band pass filter device which filters a signal to be filtered derived from a signal received by at least one of the antennae so as to pass at least one frequency band inside the subset and to block at least one frequency band outside the subset.

3. A system according to claim 1 wherein said spatial nulling device includes a dynamic weighted antenna summation functionality operative to dynamically compute a weighted sum of signals received by said plurality of antennae wherein said weighting is performed in accordance with a plurality of weighting coefficients corresponding in number to said plurality of antennae and selected to reduce at least one spatial component of the received signals which includes interference.

4. A system according to claim 2 wherein said band pass filter has dynamically computed filter coefficients and wherein said signal manipulator also comprises a filter coefficient computer operative to dynamically compute said filter coefficients.

5. A system according to claim 4 wherein said spatial nulling device includes a weighted antenna summation functionality operative to compute a weighted sum of signals received by said plurality of antennae wherein said weighting is performed in accordance with a plurality of weighting coefficients corresponding in number to said plurality of antennae, and wherein said filter coefficient computer is operative to use said plurality of weighting coefficients to dynamically compute said filter coefficients.

6. A system according to claim 1 wherein said noise comprises white Gaussian noise.

7. A system according to claim 1 wherein said signal manipulator comprises an array of programmable band pass filters including a plurality of band pass filters corresponding in number to said plurality of antennae and wherein each individual band pass filter filters the signal received from the antenna corresponding to the individual band pass filter so as to pass all frequency bands inside the subset and to block all frequency bands outside the subset.

8. A system according to claim 1 wherein said signal manipulator receives information indicative of said cleaner signal and operates in accordance therewith.

9. A system according to claim 8 wherein said signal manipulator determines said subset at least partly based on said information indicative of said cleaner signal.

10. A system according to claim 2 wherein said signal manipulator receives signals from said antenna array and feeds signal to said spatial nulling device and wherein said programmable band pass filter device comprises an array of programmable band pass filters including a plurality of band pass filters corresponding in number to said plurality of antennae and wherein each individual band pass filter filters the signal received from the antenna corresponding to the individual band pass filter so as to pass at least one frequency band inside the subset and to block at least one frequency band outside the subset.

11. A system according to claim 2 wherein said spatial nulling device receives signals from said antenna array and feeds signal to said signal manipulator and wherein said signal to be filtered comprises an output signal generated by said spatial nulling device.

12. A system according to claim 1 wherein said signal manipulator performs at least one frequency-dependent operation on said received signals.

13. A system according to claim 1 wherein each said noise injector has dynamically configurable noise parameters and wherein said signal manipulator also comprises a noise parameter computer operative to dynamically compute said noise parameters.

14. A system according to claim 13 wherein said configurable noise parameters define frequency bands of the noise.

15. A system according to claim 13 wherein said spatial nulling device includes a weighted antenna summation functionality operative to compute a weighted sum of signals received by said plurality of antennae wherein said weighting is performed in accordance with a plurality of weighting coefficients corresponding in number to said plurality of antennae, and wherein said noise parameters computer is operative to use said plurality of weighting coefficients to dynamically compute said noise parameters.

16. A system according to claim 1 wherein said subset of frequency bands in which the spatial nulling device is more effective comprises frequencies satisfying a predefined criterion based on at least the estimated reduction of said at least one spatial component of the received signal at said frequencies.

17. A system according to claim 1 wherein said subset of frequency bands in which the spatial nulling device is more effective comprises frequencies satisfying a predefined criterion based on at least an estimated signal to interference ratio of said cleaner signal at said frequencies.

18. A system according to claim 1 and further comprising a scheduler which is operative, for each individual time frame from among at least one time frame defined along a temporal axis, to allocate to said at least one data transmission, respective portions of a time-frequency region defined over said individual time frame; and to cause said at least one data transmission to be more concentrated in the subset of frequency bands by manipulating a derivative of said received signals so as to cause said scheduler to allocate said at least one data transmission such that said data transmission is more concentrated in the subset of frequency bands in which the spatial nulling device is more effective and is less concentrated in frequency bands which do not belong to said subset of frequency bands.

19. A system according to claim 1 wherein said spatial nulling device receives signals from said antenna array and feeds a signal to said signal manipulator,
and wherein said signal derived from said signals received by said at least one of the antennae comprises an output signal generated by said spatial nulling device.

20. A system according to claim 1 wherein said signal manipulator is operative to cause said at least one data transmission to be more concentrated in the subset of frequency bands in which the spatial nulling device is more effective relative to the spatial nulling device's lower effectivity in frequency bands which do not belong to said subset of frequency bands and to be less concentrated in said frequency bands which do not belong to said subset of frequency bands.

21. A method for cancelling spatial interference associated with an original multi-carrier signal carrying at least one data transmission sent by a transmitter to an antenna array comprising a plurality of antennae and having a receiver operatively associated therewith, the method receiving a plurality of received signals respectively including said interference and said original signal as received by a respective individual antenna from among the plurality of antennae, the method comprising:
using a spatial nulling device for generating a cleaner signal by reducing at least one spatial component of said interference; and
manipulating a derivative of said received signals so as to cause said at least one data transmission to be more concentrated in a subset of frequency bands in which the spatial nulling device is more effective and to be less concentrated in frequency bands which do not belong to said subset of frequency bands,
wherein said manipulating comprises using a programmable band limited noise injector device which adds noise to a signal derived from a signal received by at least one of the antennae such that noise is added only to frequency bands outside the subset and not to frequency bands inside the subset.

22. A method according to claim 21 and further comprising:
providing a scheduler which is operative, for each individual time frame along a temporal axis, to allocate to said at least one data transmission, at least one respective portion of a time-frequency region defined over said individual time frame; and
adapting said spatial nulling device to said interference, the adapting comprising:
using the scheduler to reserve at least one empty sub-region within said time-frequency region by allocating only at least one portion external to said sub-region to said at least one data transmission, rather than allocating any portion disposed internally of said sub-region to said at least one data transmission; and
configuring the spatial nulling device by deriving, from signal content in the empty sub-region, at least one interference-dependent parameter of the spatial nulling device's operation.

23. A method according to claim 21 wherein said manipulating includes manipulating the received signals to cause the transmitter-receiver communications to be allocated only to the subset of frequency bands in which the spatial nulling device satisfies a predetermined effectiveness criterion.

24. A method according to claim 22 wherein said manipulating includes manipulating the received signals to cause the transmitter-receiver communications to be allocated only to the subset of frequency bands in which the spatial nulling device satisfies to a predetermined effectiveness criterion.

25. A method according to claim 24 wherein said using the scheduler includes using the signal manipulator to manipulate the received signals so as to prevent the scheduler from allocating said empty sub-region to any of the data transmissions.

26. A method according to claim 22 wherein said using the scheduler comprises configuring the scheduler to reserve said at least one empty sub-region by allocating only said portions external to said sub-region to each of the data transmissions.

27. A method according to claim 22 wherein said using the scheduler comprises:
generating a request to the scheduler for allocation of a sub-region within said time-frequency region to an auxiliary transmitter;
employing the scheduler to accede to said request by allocating at least one individual sub-region to the auxiliary transmitter; and
refraining from transmitting within the individual sub-region.

28. A method according to claim 27 wherein generating a request to the scheduler comprises generating said request by said auxiliary transmitter.

* * * * *